(12) United States Patent
Lee et al.

(10) Patent No.: US 12,461,349 B2
(45) Date of Patent: Nov. 4, 2025

(54) ZOOM LENS AND IMAGE PICKUP APPARATUS

(71) Applicant: CANON KABUSHIKI KAISHA, Tokyo (JP)

(72) Inventors: Yonghee Lee, Tochigi (JP); Tomoya Yamada, Tochigi (JP); Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 18/189,260

(22) Filed: Mar. 24, 2023

(65) Prior Publication Data
US 2023/0350173 A1  Nov. 2, 2023

(30) Foreign Application Priority Data
May 2, 2022  (JP) .................. 2022-076153

(51) Int. Cl.
G02B 15/14 (2006.01)
G03B 5/02 (2021.01)
G03B 13/34 (2021.01)
G02B 13/18 (2006.01)

(52) U.S. Cl.
CPC . G02B 15/145125 (2019.08); G02B 15/1461 (2019.08); G03B 5/02 (2013.01); G03B 13/34 (2013.01); G02B 13/18 (2013.01); G03B 2205/0046 (2013.01)

(58) Field of Classification Search
CPC .......................... G02B 15/145; G02B 15/1451; G02B 15/146; G02B 15/1461; G02B 15/145125; G03B 5/02; G03B 2205/0046

USPC .................................................. 359/676, 695
See application file for complete search history.

(56) References Cited

U.S. PATENT DOCUMENTS

| | | | |
|---|---|---|---|
| 5,416,639 A * | 5/1995 | Yamanashi .... | G02B 15/144511 359/686 |
| 7,433,130 B2 * | 10/2008 | Sugita ................ | G02B 15/1465 359/679 |
| 9,264,638 B2 | 2/2016 | Nakamura et al. | |
| 9,268,120 B2 | 2/2016 | Shimomura et al. | |
| 9,291,800 B2 | 3/2016 | Inomoto et al. | |
| 9,310,592 B2 | 4/2016 | Wakazono et al. | |
| 9,715,092 B2 | 7/2017 | Inomoto | |

(Continued)

FOREIGN PATENT DOCUMENTS

| | | |
|---|---|---|
| JP | 2015-018083 A | 1/2015 |
| JP | 2017-203912 A | 11/2017 |

*Primary Examiner* — Bumsuk Won
*Assistant Examiner* — Alex Park Rickel
(74) *Attorney, Agent, or Firm* — Carter, DeLuca & Farrell LLP

(57) ABSTRACT

A zoom lens includes in order from an object side to an image side: a first lens unit having a positive refractive power not moving for zooming; at least three lens units moving during zooming; and a final lens unit having a positive refractive power, wherein an interval between adjacent lens units changes during zooming, a refractive index and an Abbe number of positive lenses arranged closest to the object side among positive lenses included in the first lens unit, a focal length of the first lens unit, a focal length of the zoom lens at a wide angle end, a focal length of the zoom lens at a telephoto end, and a back focus of the zoom lens at the wide angle end are appropriately set.

11 Claims, 22 Drawing Sheets

(56) References Cited

U.S. PATENT DOCUMENTS

| | | | |
|---|---|---|---|
| 9,897,803 B2 | 2/2018 | Sanjo et al. | |
| 10,338,359 B2 | 7/2019 | Kuwashiro et al. | |
| 10,551,599 B2 | 2/2020 | Yamada et al. | |
| 10,678,031 B2 | 6/2020 | Inomoto | |
| 10,955,647 B2* | 3/2021 | Ogawa | G02B 15/173 |
| 11,061,212 B2 | 7/2021 | Yamada et al. | |
| 11,294,156 B2 | 4/2022 | Inomoto | |
| 11,307,400 B2 | 4/2022 | Takemoto et al. | |
| 2016/0124199 A1 | 5/2016 | Sanjo et al. | |
| 2016/0274341 A1* | 9/2016 | Yonezawa | G02B 15/17 |
| 2017/0108676 A1* | 4/2017 | Hori | G02B 15/1461 |
| 2017/0108677 A1* | 4/2017 | Shimomura | G02B 15/20 |
| 2020/0271907 A1* | 8/2020 | Inomoto | G02B 15/144109 |
| 2021/0048654 A1* | 2/2021 | Ogawa | G02B 15/145125 |
| 2021/0048655 A1* | 2/2021 | Shimomura | G02B 15/20 |
| 2021/0088763 A1* | 3/2021 | Yonezawa | G02B 15/1451 |
| 2021/0109330 A1* | 4/2021 | Hori | G02B 15/173 |
| 2021/0141197 A1 | 5/2021 | Lee | |
| 2022/0236543 A1* | 7/2022 | Ikeda | G02B 15/145127 |
| 2023/0350168 A1 | 11/2023 | Yamada | |

* cited by examiner

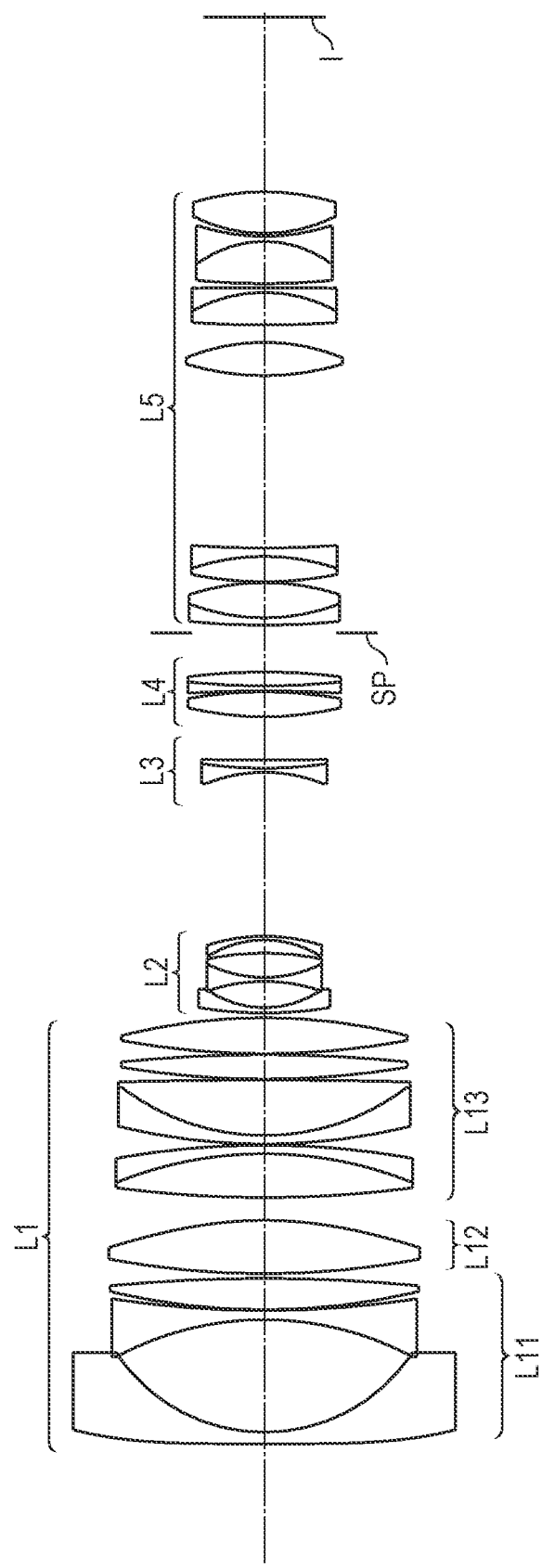

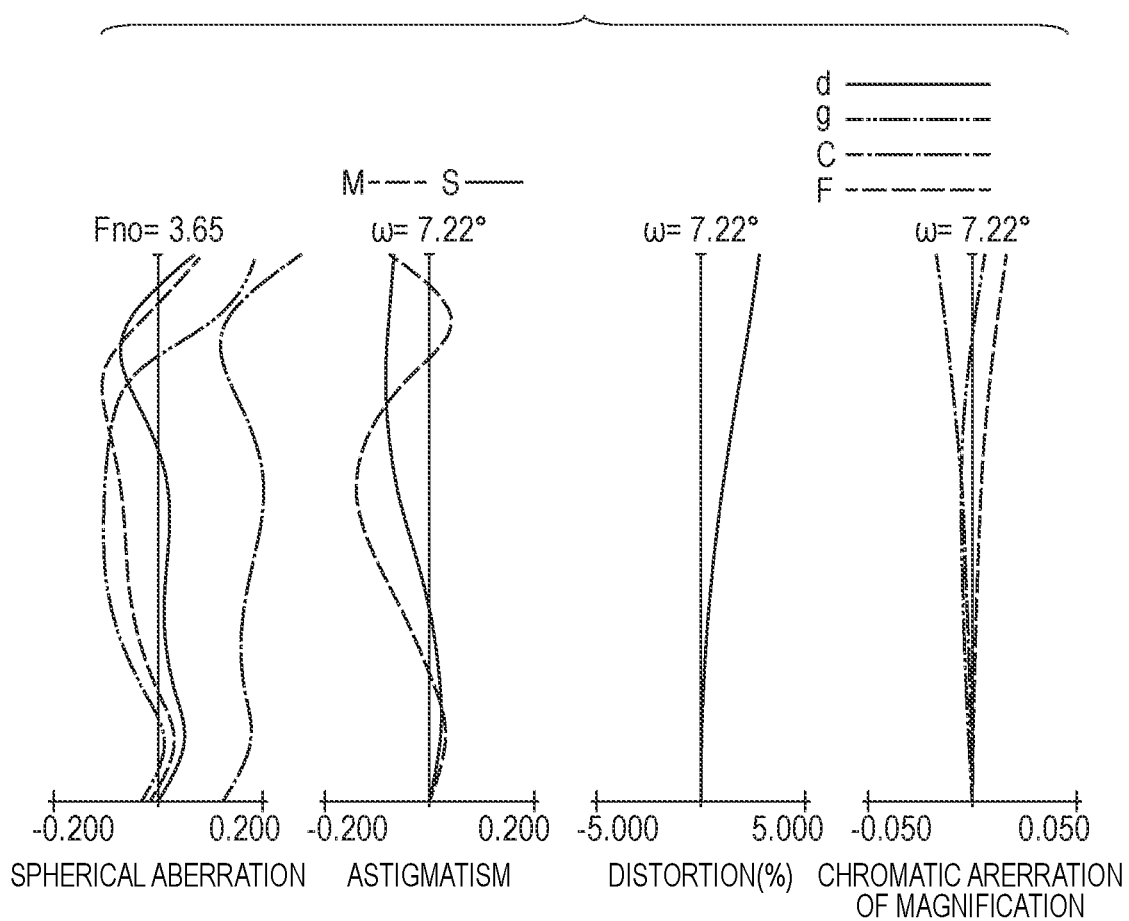

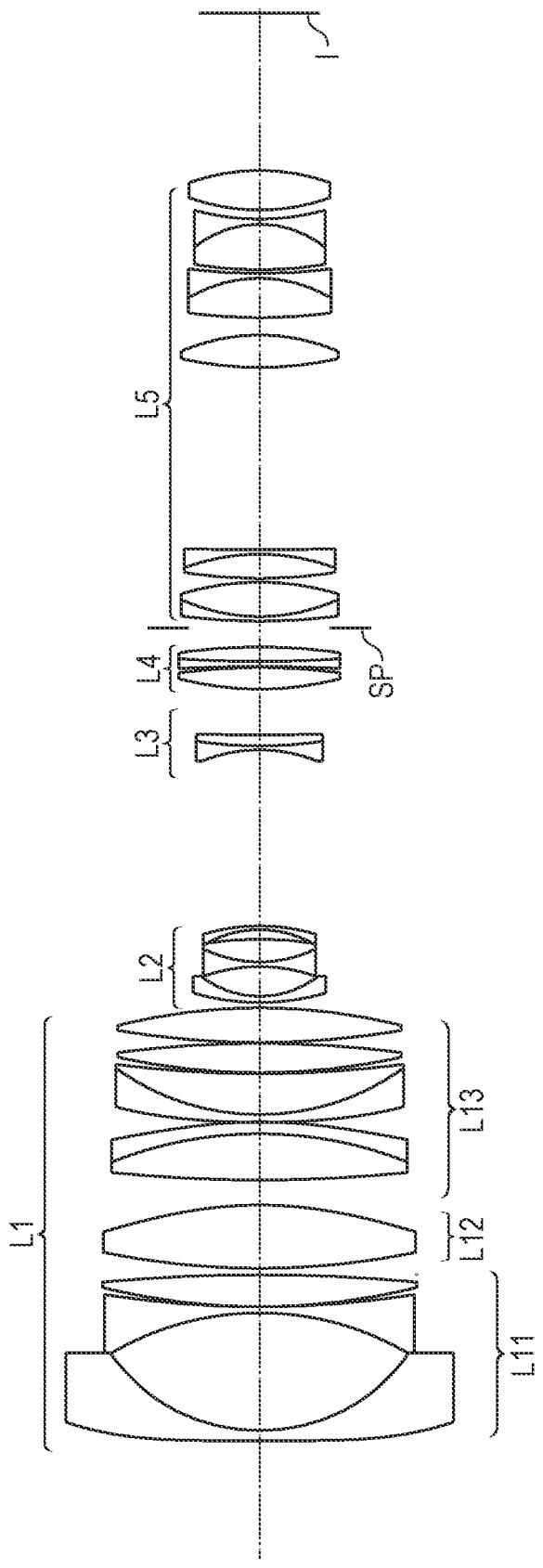

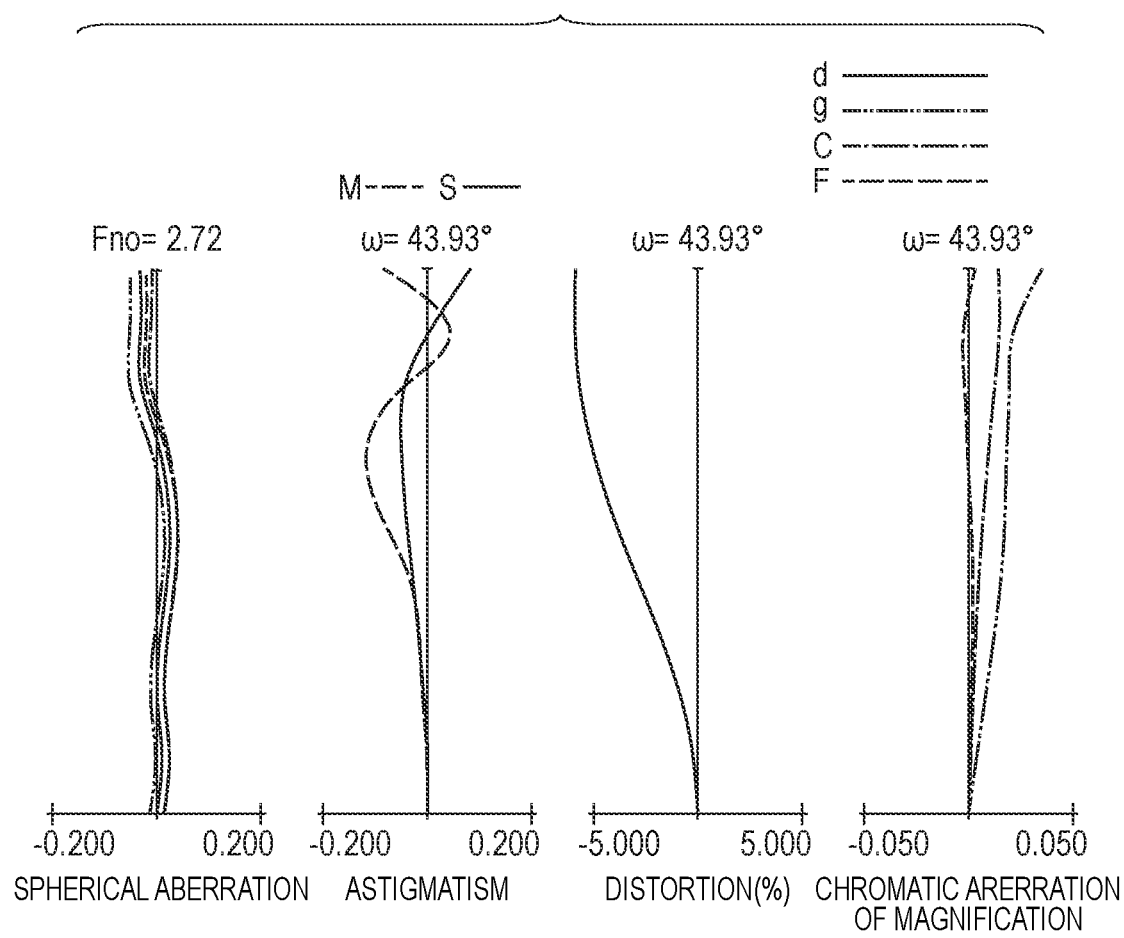

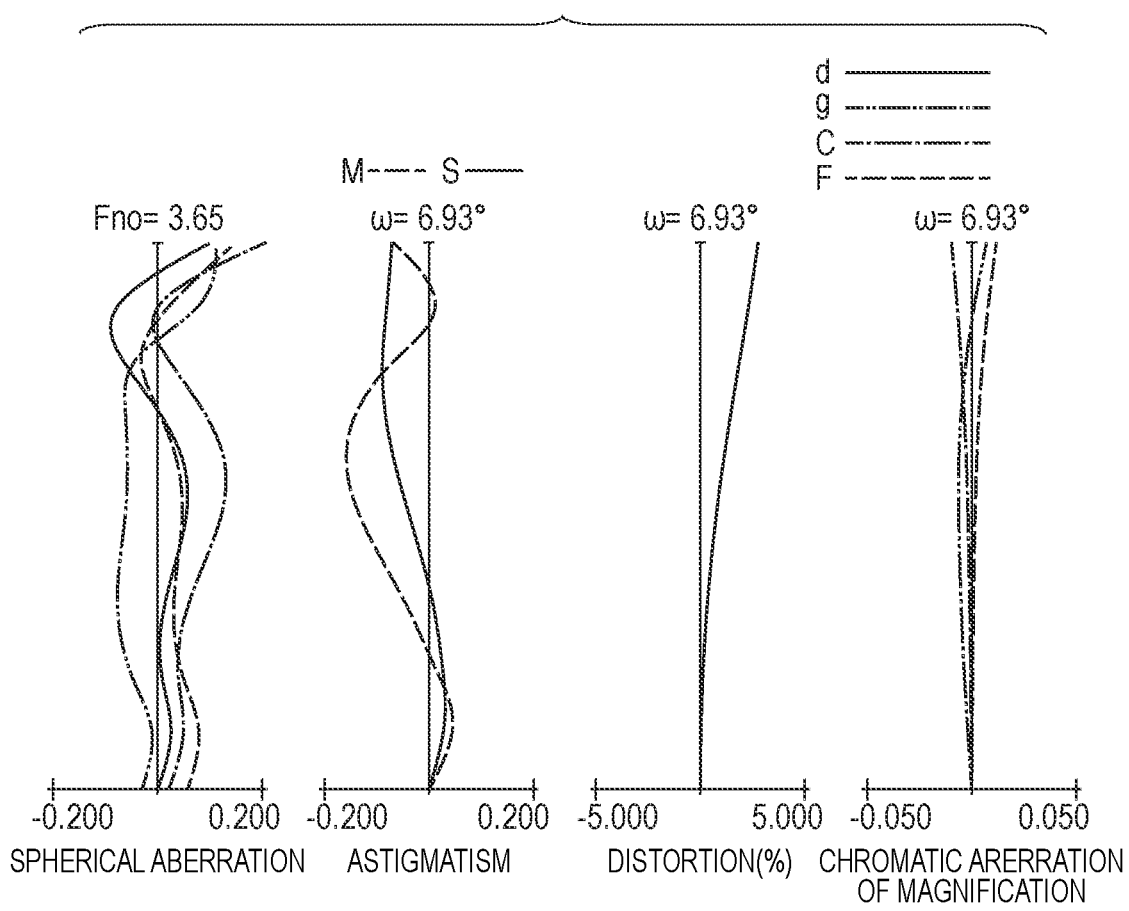

ZOOM LENS AND IMAGE PICKUP APPARATUS

BACKGROUND OF THE INVENTION

Field of the Invention

The present invention relates to a zoom lens and an image pickup apparatus.

Description of the Related Art

With the higher functionality of an image pickup apparatus (camera) using an image pickup element, a zoom lens having a high zoom ratio and high optical performance is required. In particular, for a high-pixel image pickup element used in a professional-use television camera or a movie camera, a high resolution and low chromatic aberration with high uniformity are required from the center to the periphery of the image. As such a zoom lens, there is known a positive lead type zoom lens including a lens unit having a positive refractive power disposed closest to an object side and including five or more lens units as a whole.

Japanese Patent Application Laid-Open No. 2015-018083 discloses a zoom lens including in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, and having a zoom ratio of about 7.

Japanese Patent Application Laid-Open No. 2017-203912 discloses a zoom lens including in order from an object side to an image side, a first lens unit having a positive refractive power, a second lens unit having a negative refractive power, a third lens unit having a negative refractive power, a fourth lens unit having a negative refractive power, and a fifth lens unit having a positive refractive power, and having a zoom ratio of about 8.

In positive lead type zoom lenses, in order to obtain a wide angle of view, a high zoom ratio, and a high optical performance, it is necessary to appropriately arrange the refractive power and the glass material in each lens unit. For example, since the off-axis light flux passes through a position significantly away from the optical axis, the lens unit closest to the object side significantly affects magnification chromatic aberration.

SUMMARY OF THE INVENTION

The present invention provides a zoom lens beneficial in for example, a wide angle of view, a high zoom ratio, and a high optical performance over an entire zoom range.

According to an aspect of the present invention, a zoom lens includes in order from an object side to an image side: a first lens unit having a positive refractive power which does not move for zooming; at least three lens units which move during zooming; and a final lens unit having a positive refractive power, wherein an interval between adjacent lens units changes during zooming, in which the zoom lens comprises an aperture stop arranged in or adjacent to the final lens unit, and following inequalities are satisfied, $1.86 \leq np \leq 2.15$ $15.0 \leq vp \leq 22.0$ $2.35 \leq ft/f1 \leq 6.00$ $0.28 \leq fw/BF \leq 0.43$ where np and vp represent a refractive index and an Abbe number of a positive lens arranged closest to the object side among positive lenses included in the first lens unit, respectively, f1 represents a focal length of the first lens unit, fw represents a focal length of the zoom lens at a wide angle end, ft represents a focal length of the zoom lens at a telephoto end, and BF denotes a back focus of the zoom lens at the wide angle end.

According to the present invention, it is possible to provide a zoom lens beneficial in, for example, a wide angle of view, a high zoom ratio, and a high optical performance over the entire zoom range.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to Embodiment 1 at a wide angle end when focused on an object at infinity.

FIG. 4B is an aberration diagram of the zoom lens according to Embodiment 2 at the telephoto end when focused on the object at infinity.

FIG. 5 is a lens cross-sectional view of the zoom lens according to Embodiment 3 at the wide angle end when focused on an object at infinity.

FIG. 10A is an aberration diagram of the zoom lens according to Embodiment 5 at the wide angle end when focused on the object at infinity.

FIG. 10B is an aberration diagram of the zoom lens according to Embodiment 5 at the telephoto end when focused on the object at infinity.

DESCRIPTION OF THE EMBODIMENTS

Figure 2A:
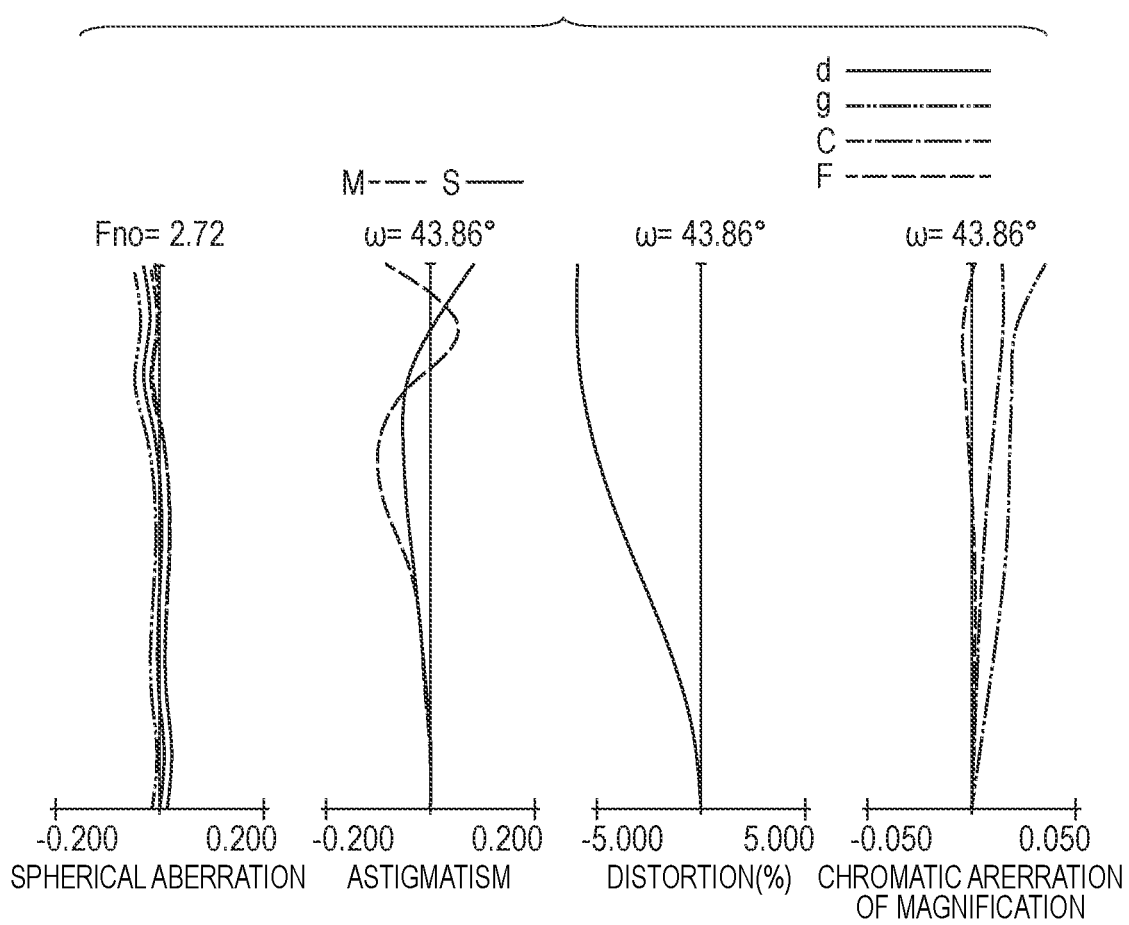
FIG. 2A is an aberration diagram of the zoom lens according to Embodiment 1 at the wide angle end when focused on the object at infinity.

Preferred embodiments of the present invention will now be described in detail with reference to the accompanying drawings.

The present invention relates to a zoom lens and an image pickup apparatus having the same, and more particularly to a zoom lens suitable for a cinema camera, a broadcast camera, a video camera, a monitoring camera, a digital still camera, a silver halide photographic camera, and the like, and an image pickup apparatus having the same.

The zoom lens of the present invention includes in order from the object side to the image side, a first lens unit having a positive refractive power which does not move for zooming, at least three lens units that are moved for zooming, and a final lens unit having a positive refractive power. An interval between adjacent lens units changes during zooming. An aperture stop is disposed in the final lens unit or adjacent to the final lens unit.

The zoom lens satisfies the following inequalities, $$1.86 \leq np \leq 2.15 \tag{1}$$

$$15.0 \leq vp \leq 22.0 \tag{2}$$

$$2.35 \leq ft/f1 \leq 6.00 \tag{3}$$

$$0.28 \leq fw/BF \leq 0.43 \tag{4}$$

where $np$ and $vp$ represent a refractive index and an Abbe number at the d-line of a positive lens arranged at the most object side among positive lenses included in the first lens unit, f1 represents a focal length of the first lens unit, fw represents a focal length of the zoom lens at a wide angle end, ft represents a focal length of the zoom lens at a telephoto end, and BF represents a back focus of the zoom lens at the wide angle end.

Here, the Abbe number $v$ (d-line reference) at the d-line is represented by the following expression, $$v = (Nd-1)/(NF-NC)$$

where $Nd$, $NF$, and $NC$ represent refractive indices for the d-line (587.6 nm), the F-line (486.1 nm), and the C-line (656.3 nm) of the Fraunhofer line.

Inequalities (1) and (2) define the characteristics of an optical glass of the lens arranged closest to the object side among the positive lenses of the first lens unit. By using the optical glass that satisfies the inequalities (1) and (2), zoom variation and focus variation of chromatic aberration can be suppressed.

Inequality (3) defines a ratio of the focal length of the zoom lens at the telephoto end to the focal length of the first lens unit. By satisfying the inequality (3), a configuration beneficial in a high zoom ratio can be achieved. When the upper limit of the inequality (3) is not satisfied, the magnification of the aberration of the first lens unit becomes large, and it becomes difficult to suppress various aberrations. When the lower limit of the inequality (3) is not satisfied, it becomes difficult to achieve a high zoom ratio.

The inequality (4) defines a ratio of the-back focus focal length of the zoom lens at the wide angle end to the back focus at the wide angle end. By satisfying the inequality (4), a configuration beneficial in widening the angle can be achieved. When the upper limit of the inequality (4) is not satisfied, it becomes difficult to achieve a wide angle. When the lower limit of the inequality (4) is not satisfied, a zoom lens having an excessively wide angle is obtained, and it is difficult to suppress various aberrations.

According to still another aspect of the zoom lens of the present invention, the first lens unit includes in order from the object side to the image side, a first lens subunit having a negative refractive power, a second lens subunit having a positive refractive power, and a third lens subunit having a positive refractive power. An interval between adjacent lens subunits changes for focusing. Preferably, the first lens subunit does not move for focusing, at least the second lens subunit is moved for focusing, and the third lens subunit does not move for focusing. This configuration is effective in achieving a wide angle of view.

According to still another aspect of the zoom lens of the present invention, the first sub lens unit is composed of two or three negative lenses and one positive lens arranged in order from the object side to the image side. With this configuration, it is possible to reduce the size and weight while suppressing chromatic aberration.

According to still another aspect of the zoom lens of the present invention, the third lens subunit is composed of five or less lenses. With this configuration, it is possible to reduce the size and weight while suppressing chromatic aberration.

As a further aspect of the zoom lens of the present invention, it is preferable that the following inequalities are satisfied.

$$-0.0040 \leq (\theta 11p\_ave - \theta 11n\_ave)/(v11p\_ave - v11n\_ave) \leq -0.0020 \tag{5}$$

$$-34.0 \leq (v11p\_ave - v11n\_ave) \leq -21.0 \tag{6}$$

$$-3.00 \leq fp1/f11 \leq -1.90 \tag{7}$$

$$0.80 \leq fn1/f11 \leq 1.50 \tag{8}$$

$$-1.70 \leq f11/f1 \leq -0.70 \tag{9}$$

$$-0.0022 \leq (\theta 13p\_ave - \theta 13n\_ave)/(v13p\_ave - v13n\_ave) \leq -0.0006 \tag{10}$$

Here, $\theta 11p\_ave$ and $v11p\_ave$ represent an average partial dispersion ratio and an average Abbe number of positive lenses included in the first lens subunit, respectively. Here, the average partial dispersion ratio and the average Abbe number of the positive lenses of the first lens subunit refer to the partial dispersion ratio and the Abbe number of one positive lens included in the first lens subunit. $\theta 11n\_ave$ and $v11n\_ave$ represent the average partial dispersion ratio and average Abbe number of the negative lenses included in the first lens subunit. Further, fp1 represents the focal length of the positive lens arranged closest to the object side in the first lens unit, f11 represents the focal length of the first lens subunit, and fn1 represents the focal length of the negative lens arranged closest to the object side in the first lens unit. θ13p_ave and ν13p_ave represent an average partial dispersion ratio and an average Abbe number of positive lenses included in the third lens subunit, respectively, and θ13n_ave and ν13n_ave represent an average partial dispersion ratio and an average Abbe number of negative lenses included in the third lens sub unit.

Here, the partial dispersion ratio θ (g-line and F-line reference) is represented by the following expression, $$\theta = (Ng-NF)/(NF-NC)$$

where Ng, NF, and NC represent refractive indices of the Fraunhofer line with respect to g-line (435.8 nm), F-line (486.1 nm), and C-line (656.3 nm), respectively.

Inequality (5) defines a residual secondary spectrum of the chromatic aberration of the first lens subunit. If the upper limit of the inequality (5) is not satisfied, the secondary spectrum of the chromatic aberration of magnification at the telephoto end becomes insufficient, and it becomes difficult to satisfactorily correct the chromatic aberration over the entire zoom range. If the lower limit of the inequality (5) is not satisfied, the secondary spectrum of the chromatic aberration of magnification at the telephoto end becomes excessive correction, which is not preferable.

The inequality (6) defines a condition for achromatizing the first lens subunit. When the upper limit of the inequality (6) is not satisfied, the refractive power of each lens of the first lens subunit becomes small, and it becomes difficult to correct the chromatic aberration. If the lower limit of the inequality (6) is not satisfied, the achromatic effect becomes insufficient, and it becomes difficult to reduce the chromatic aberration of magnification particularly in the wide angle side.

Inequality (7) defines a ratio of the focal length of the positive lens arranged closest to the object side in the first lens unit to the focal length of the first lens subunit. If the upper limit of the inequality (7) is not satisfied, the refractive power of the positive lens arranged closest to the object side in the first lens unit becomes too weak, and it becomes difficult to correct the chromatic aberration. When the lower limit of the inequality (7) is not satisfied, the refractive power of the positive lens arranged closest to the object side of the first lens unit becomes too strong, and it becomes difficult to correct various aberrations.

Inequality (8) defines a ratio between the focal length of the negative lens arranged closest to the object side in the first lens unit and the focal length of the first lens subunit. If the upper limit of the inequality (8) is not satisfied, the refractive power of the negative lens arranged closest to the object side in the first lens unit becomes too weak, and it becomes difficult to correct the chromatic aberration. If the lower limit of the inequality (8) is not satisfied, the refractive power of the negative lens arranged closest to the object side in the first lens unit becomes too strong, and it becomes difficult to correct various aberrations.

Inequality (9) defines a ratio of the focal length of the first lens subunit to the focal length of the first lens unit. When the upper limit of the inequality (9) is not satisfied, the focal length of the first lens subunit becomes too short, and it becomes difficult to suppress variation of various off-axis aberrations due to zooming on the wide angle side. When the lower limit of the inequality (9) is not satisfied, the focal length of the first lens unit becomes long, the lens diameter of the first lens unit becomes large and it becomes difficult to widen the angle of view.

Inequality (10) defines the residual secondary spectrum of the chromatic aberration of the third lens subunit. If the upper limit of inequality (10) is not satisfied, the correction of the secondary spectrum becomes excessive. If the lower limit of inequality (10) is not satisfied, correction of the secondary spectrum is insufficient and the chromatic aberration remains.

The numerical ranges of inequalities (1) to (10) are preferably set as follows.

$$1.87 \leq np \leq 2.10 \tag{1a}$$

$$16.0 \leq vp \leq 21.5 \tag{2a}$$

$$2.39 \leq ft/f1 \leq 5.60 \tag{3a}$$

$$0.30 \leq fw/BF \leq 0.42 \tag{4a}$$

$$-0.0038 \leq (\theta 11p\_ave - \theta 11n\_ave)/(v11p\_ave - v11n\_ave) \leq -0.0022 \tag{5a}$$

$$-32.0 \leq (v11p\_ave - v11n\_ave) \leq -22.5 \tag{6a}$$

$$-2.95 \leq fp1/f11 \leq -1.95 \tag{7a}$$

$$0.85 \leq fn1/f11 \leq 1.45 \tag{8a}$$

$$-1.60 \leq f11/f1 \leq -0.80 \tag{9a}$$

$$-0.0020 \leq (\theta 13p\_ave - \theta 13n\_ave)/(v13p\_ave - v13n\_ave) \leq -0.0008 \tag{10a}$$

More preferably, the numerical ranges of inequalities (1a) to (10a) are set as follows.

$$1.88 \leq np \leq 2.05 \tag{1b}$$

$$17.0 \leq vp \leq 21.0 \tag{2b}$$

$$2.43 \leq ft/f1 \leq 5.20 \tag{3b}$$

$$0.32 \leq fw/BF \leq 0.41 \tag{4b}$$

$$-0.0036 \leq (\theta 11p\_ave - \theta 11n\_ave)/(v11p\_ave - v11n\_ave) \leq -0.0024 \tag{5b}$$

$$-30.0 \leq (v11p\_ave - v11n\_ave) \leq -24.0 \tag{6b}$$

$$-2.90 \leq fp1/f11 \leq -2.00 \tag{7b}$$

$$0.90 \leq fn1/f11 \leq 1.40 \tag{8b}$$

$$-1.50 \leq f11/f1 \leq -0.90 \tag{9b}$$

$$-0.0018 \leq (\theta 13p\_ave - \theta 13n\_ave)/(v13p\_ave - v13n\_ave) \leq -0.0010 \tag{10b}$$

Further, the image pickup apparatus of the present invention includes the zoom lens of each embodiment and an image pickup element having a predetermined effective image pickup range for receiving an image formed by the zoom lens.

Next, features of each embodiment will be described.

Embodiment 1

The zoom lens according to Embodiment 1 of the present invention has the following configuration in order from the object side to the image side. The zoom lens includes a first lens unit L1 having a positive refractive power which does not move for zooming, a second lens unit L2 having a negative refractive power which moves for zooming, a third lens unit L3 having a negative refractive power which moves for zooming, a fourth lens unit L4 having a positive refractive power which moves for zooming, an aperture stop SP, and a fifth lens unit L5 which is a final lens unit having a positive refractive power for forming an image.

Figure 2B:
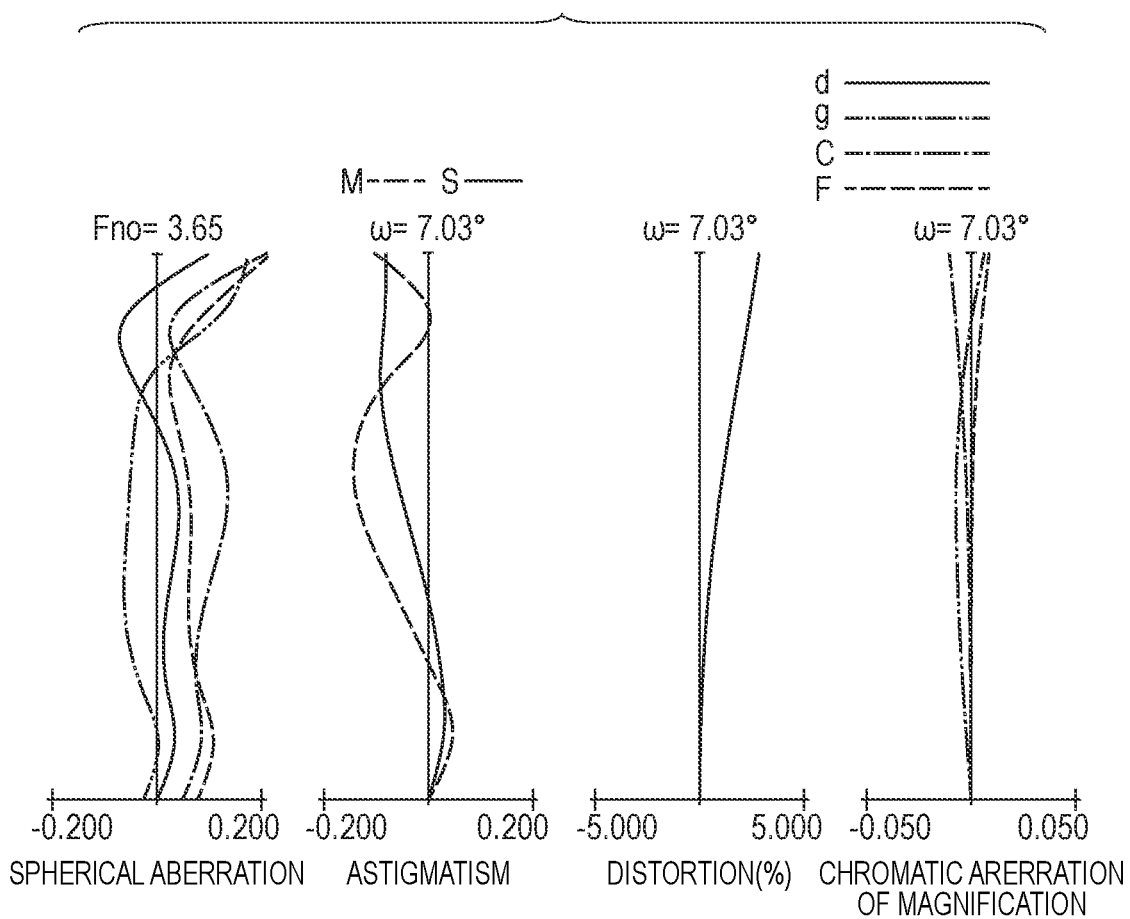
FIG. 2B is an aberration diagram of the zoom lens according to Embodiment 1 at the telephoto end when focused on the object at infinity.

FIG. 1 is a lens cross-sectional view of the zoom lens according to Embodiment 1 of the present invention when focused on an infinity object at a wide angle end. FIGS. 2A and 2B are aberration diagrams when focusing on the infinity object at the wide angle end and when focusing on the infinity object at the telephoto end, respectively. The zoom lens of each embodiment is an image pickup optical system used in an image pickup apparatus, and the left side corresponds to the subject side (object side) and the right side corresponds to the image side in the lens cross-sectional view.

In each aberration diagram, solid lines, two-dot chain lines, one-dot chain lines, and broken lines in spherical aberration represent d-line, g-line, C-line, and F-line, respectively. Solid lines and broken lines in astigmatism represent sagittal image plane ($\Delta S$) and meridional image plane ($\Delta M$), respectively, and two-dot chain lines, one-dot chain lines, and broken lines in chromatic aberration of magnification represent g-line, C-line, and F-line, respectively. Astigmatism and chromatic aberration of magnification represent aberration amounts when a beam passing through the center of the light beam at the aperture position is a principal ray.

$\omega$ denotes a half angle of view at the paraxial axis calculation, and Fno denotes an F-number. In the longitudinal aberration diagram, spherical aberration is drawn on a scale of 0.2 mm, astigmatism is drawn on a scale of 0.2 mm, distortion is drawn on a scale of 5%, and chromatic aberration of magnification is drawn on a scale of 0.05 mm. In each of the following embodiments, the wide angle end and the telephoto end refer to zoom positions when the second lens unit is positioned at both ends of a range in which the second lens unit can be moved on the optical axis. The same is true in the explanation in regarding the lens cross-sectional views and aberration diagrams in the following embodiments unless otherwise specified.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 moves during zooming and has a positive refractive power. Reference numeral SP denotes an aperture stop. The fifth lens unit L5 is a lens unit having a positive refractive power which does not move for zooming. An extender lens or the like for focal length conversion may be mounted in the fifth lens unit L5. Reference numeral I denotes an image plane, which corresponds to an imaging plane of an image pickup element (photoelectric conversion element such as CCD or CMOS) which receives an optical image formed by the zoom lens.

Embodiment 2

The zoom lens according to Embodiment 2 of the present invention has the following configuration in order from the object side to the image side. The zoom lens includes a first lens unit L1 having a positive refractive power which does not move for zooming, a second lens unit L2 having a negative refractive power which moves for zooming, a third lens unit L3 having a negative refractive power which moves for zooming, a fourth lens unit L4 having a positive refractive power which moves for zooming, an aperture stop SP, and a fifth lens unit L5 which is a final lens unit having a positive refractive power for forming an image.

Figure 3:
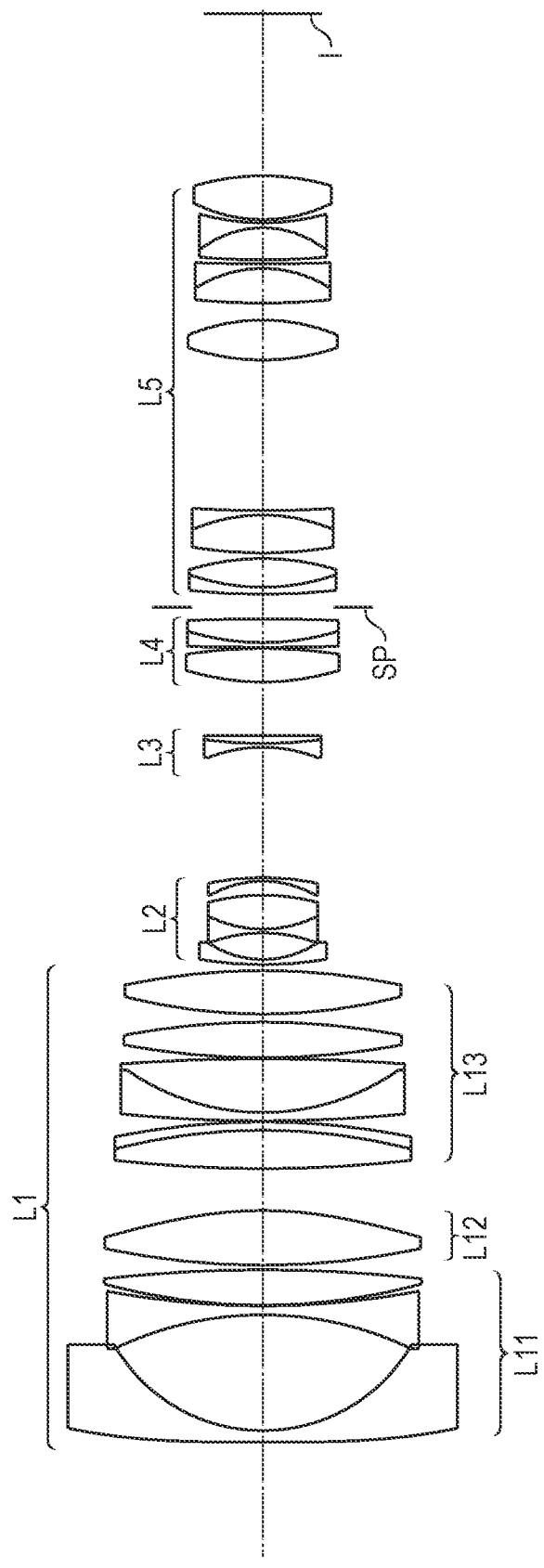
FIG. 3 is a lens cross-sectional view of the zoom lens according to Embodiment 2 at the wide angle end when focused on the object at infinity.
Figure 4A:
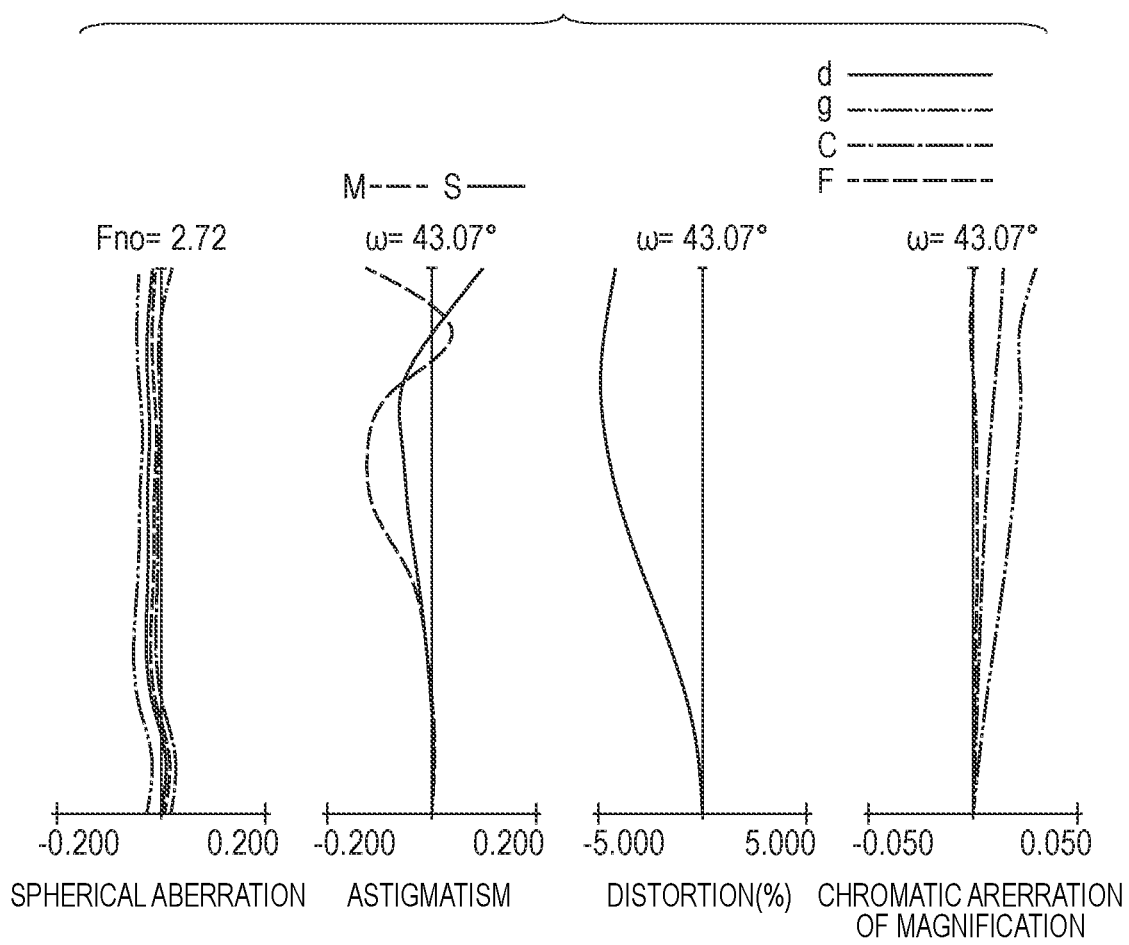
FIG. 4A is an aberration diagram of the zoom lens according to Embodiment 2 at the wide angle end when focused on the object at infinity.

FIG. 3 is a lens cross-sectional view of the zoom lens according to the second embodiment of the present invention when focused on an infinity object at the wide angle end. FIGS. 4A and 4B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 has a positive refractive power, and moves integrally with the aperture stop SP during zooming. The fifth lens unit L5 is a lens unit having a positive refractive power which does not move for zooming. An extender lens or the like for focal length conversion may be mounted in the fifth lens unit L5. Reference numeral I denotes an image plane, which corresponds to an imaging plane of an image pickup element (photoelectric conversion element such as CCD or CMOS) which receives an optical image formed by the zoom lens.

Embodiment 3

The zoom lens according to Embodiment 3 of the present invention has the following configuration in order from the object side to the image side. The zoom lens includes a first lens unit L1 having a positive refractive power which does not move for zooming, a second lens unit L2 having negative refractive power which moves for zooming, a third lens unit L3 having negative refractive power which moves for zooming, a fourth lens unit L4 having a positive refractive power which moves for zooming, an aperture stop SP, and a fifth lens unit L5 which is a final lens unit having a positive refractive power for forming an image.

Figure 6A:
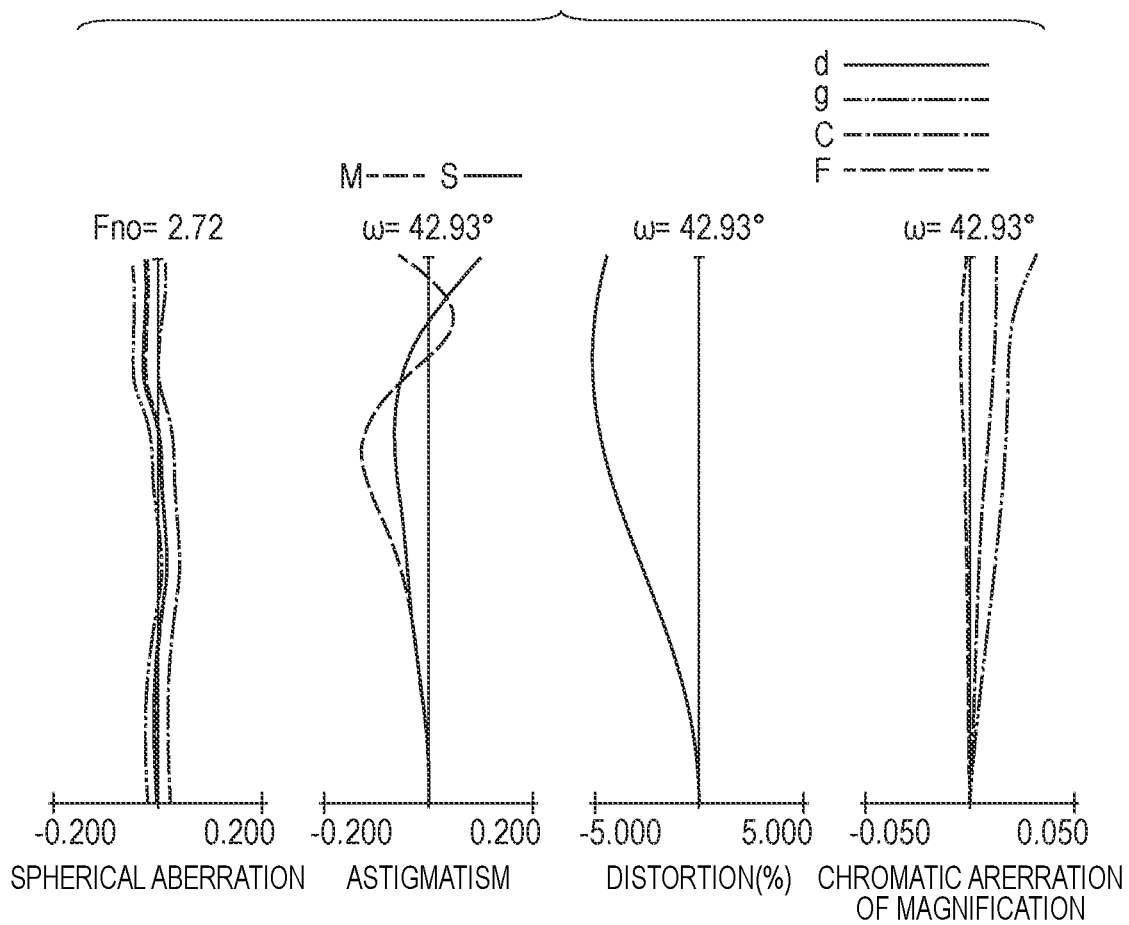
FIG. 6A is an aberration diagram of the zoom lens according to Embodiment 3 at the wide angle end when focused on the object at infinity.
Figure 6B:
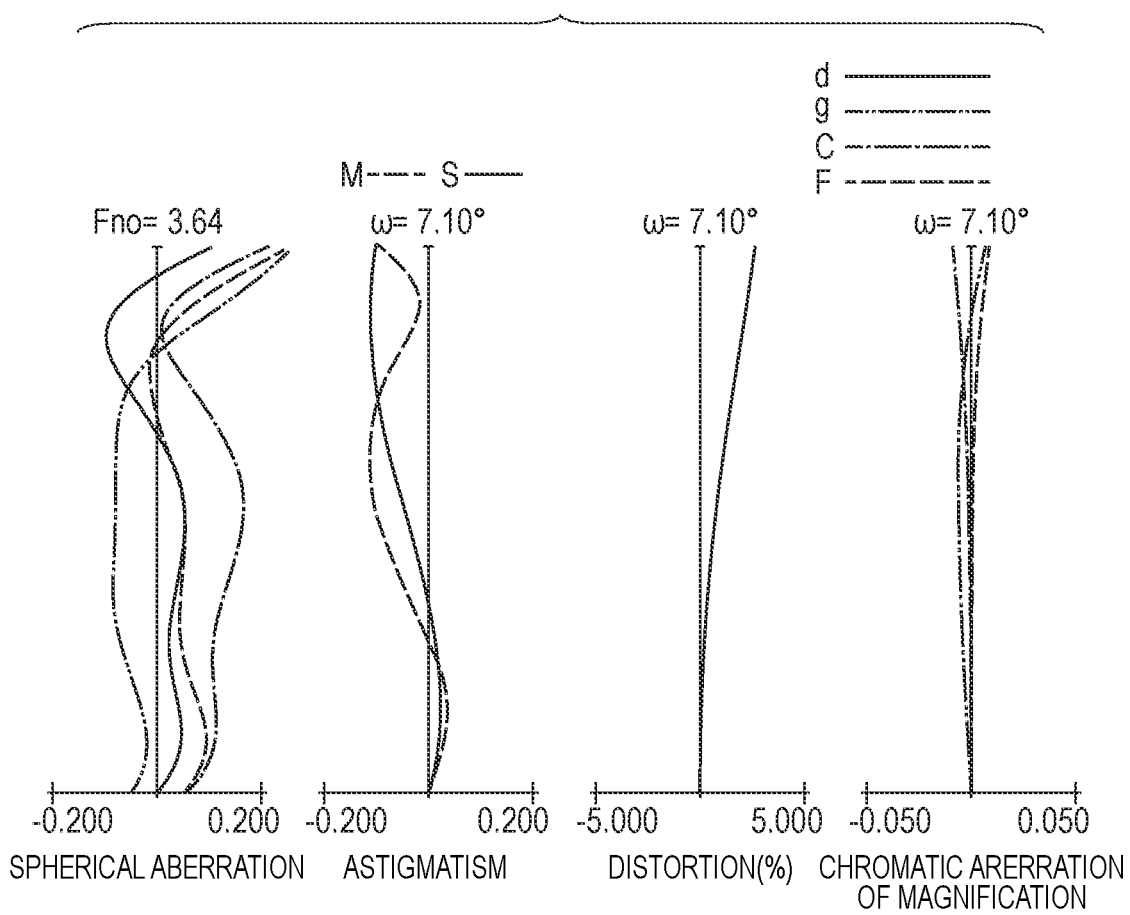
FIG. 6B is an aberration diagram of the zoom lens according to Embodiment 3 at the telephoto end when focused on the object at infinity.

FIG. 5 is a lens cross-sectional view of the zoom lens according to Embodiment 3 of the present invention when focused on an infinity object at the wide angle end. FIGS. 6A and 6B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 moves during zooming and has a positive refractive power. The aperture stop SP moves during zooming. The fifth lens unit L5 is a lens unit having a positive refractive power which does not move for zooming. An extender lens or the like for focal length conversion may be mounted in the fifth lens unit L5. Reference numeral I denotes an image plane, which corresponds to an imaging plane of an image pickup element (photoelectric conversion element such as CCD or CMOS) which receives an optical image formed by the zoom lens.

Embodiment 4

The zoom lens according to Embodiment 4 of the present invention has the following configuration in order from the object side to the image side. The zoom lens includes a first lens unit L1 having a positive refractive power which does not move for zooming, a second lens unit L2 having a negative refractive power which moves during zooming, a third lens unit L3 having a negative refractive power which moves during zooming, a fourth lens unit L4 having a negative refractive power which moves during zooming, a fifth lens unit L5 having a positive refractive power which moves during zooming, an aperture stop SP, and a sixth lens unit L6 which is a final lens unit having a positive refractive power for forming an image.

Figure 7:
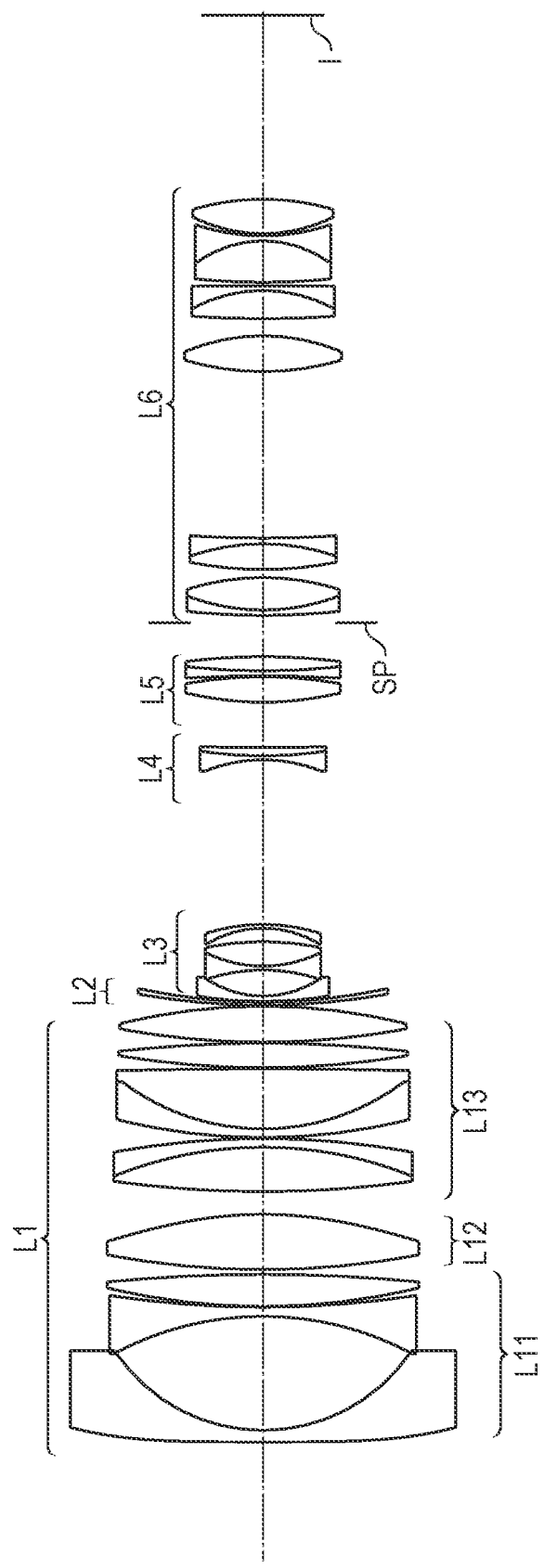
FIG. 7 is a lens cross-sectional view of the zoom lens according to Embodiment 4 at the wide angle end when focused on the object at infinity.
Figure 8A:
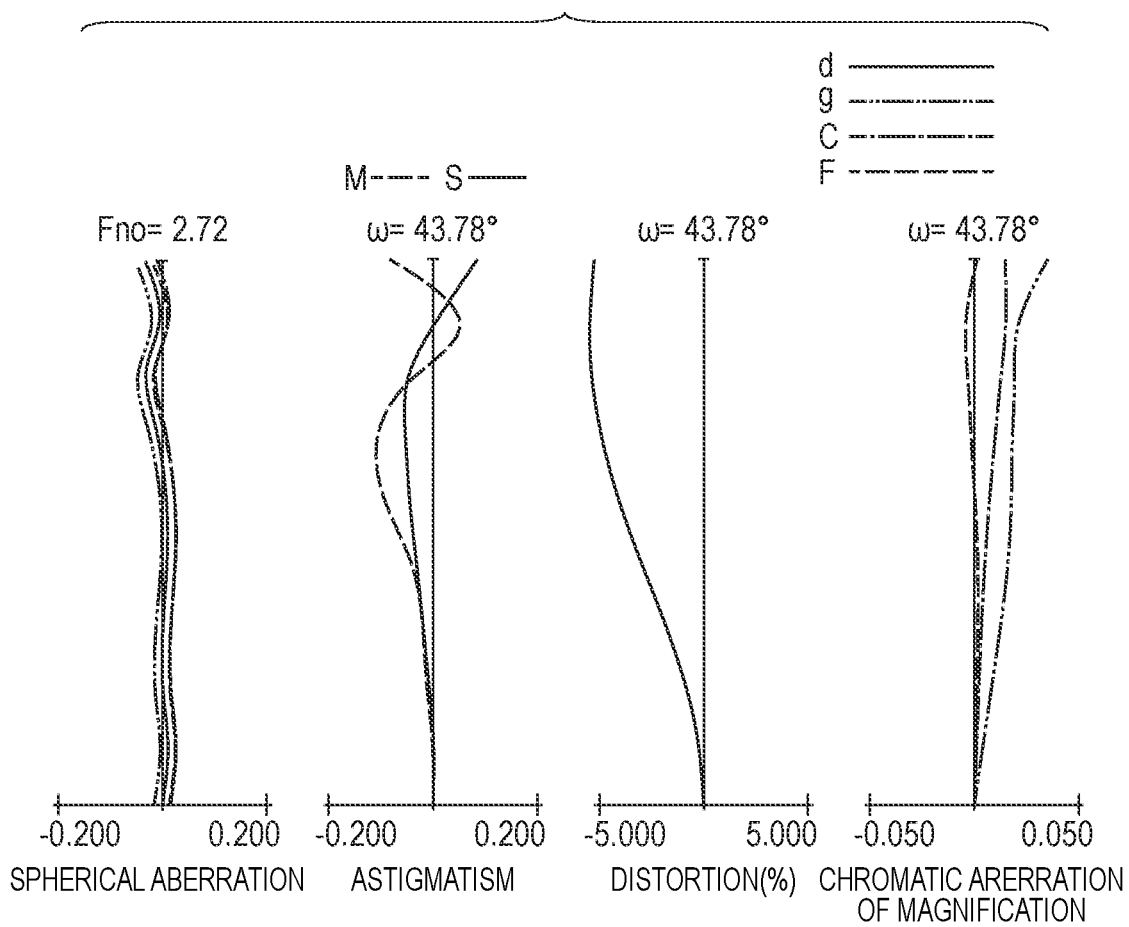
FIG. 8A is an aberration diagram of the zoom lens according to Embodiment 4 at the wide angle end when focused on the object at infinity.
Figure 8B:
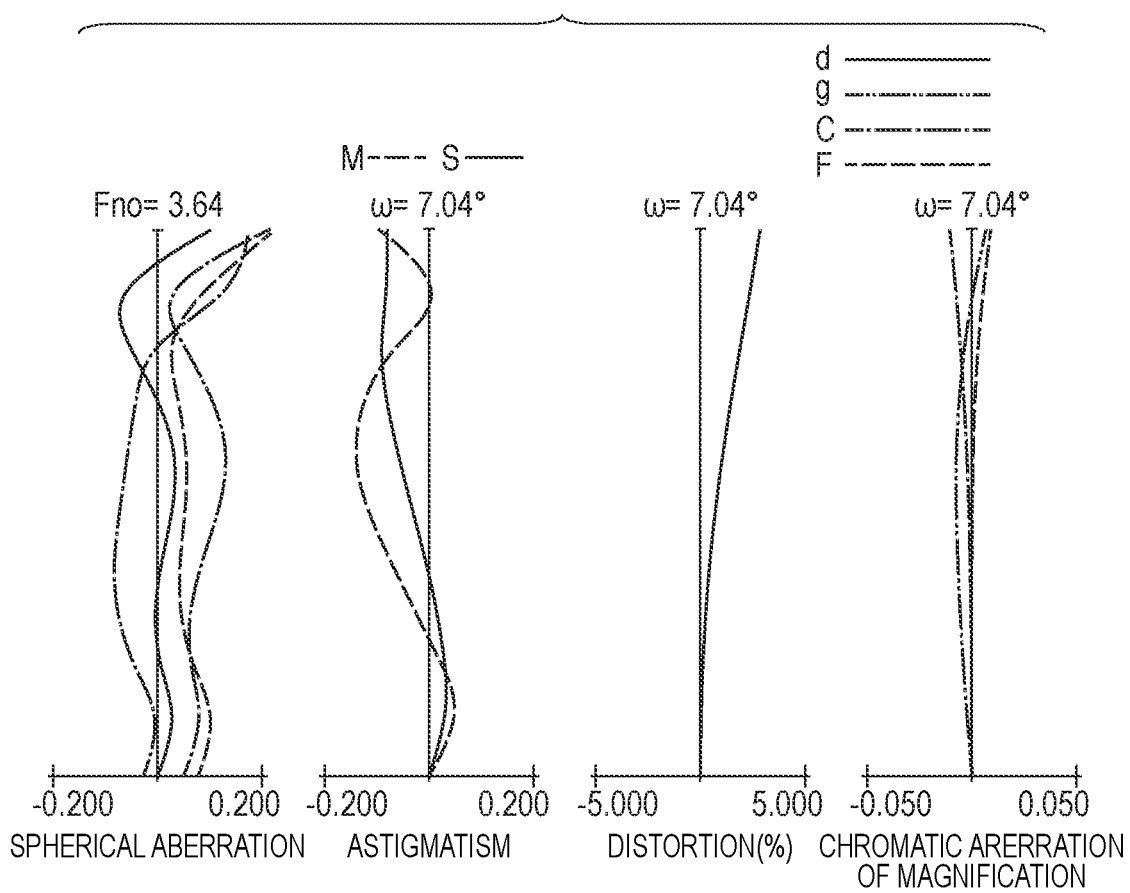
FIG. 8B is an aberration diagram of the zoom lens according to Embodiment 4 at the telephoto end when focused on the object at infinity.

FIG. 7 is a lens cross-sectional view of a zoom lens according to Embodiment 4 of the present invention when focused on an infinity object at the wide angle end. FIGS. 8A and 8B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first sub lens unit L11 having a negative refractive power, a second sub lens unit L12 having a positive refractive power, and a third sub lens unit L13 having a positive refractive power. The second sub lens unit L12 is a focus lens unit which moves from the object side to the image side at the time of focus adjustment from infinity to a finite distance. The second lens unit L2 moves during zooming and has a negative refractive power. The third lens unit L3 is a variator lens unit having a negative refractive power that moves toward the image side during zooming from the wide angle end to the telephoto end. The fourth lens unit L4 moves during zooming and has a negative refractive power. The fifth lens unit L5 has a positive refracting power. Reference numeral SP denotes an aperture stop. The sixth lens unit L6 is a lens unit having a positive refractive power which does not move for zooming. An extender lens or the like for focal length conversion may be mounted in the sixth lens unit L6. Reference numeral I denotes an image plane, which corresponds to an imaging plane of an image pickup element (photoelectric conversion element such as CCD or CMOS) which receives an optical image formed by the zoom lens.

Embodiment 5

The zoom lens according to Embodiment 5 of the present invention has the following configuration in order from the object side to the image side. The zoom lens includes a first lens unit L1 having a positive refractive power which does not move for zooming, a second lens unit L2 having a negative refractive power which moves for zooming, a third lens unit L3 having a negative refractive power which moves for zooming, a fourth lens unit L4 having a positive refractive power which moves for zooming, an aperture stop SP, and a fifth lens unit L5 which is a final lens unit having a positive refractive power for forming an image.

Figure 9:
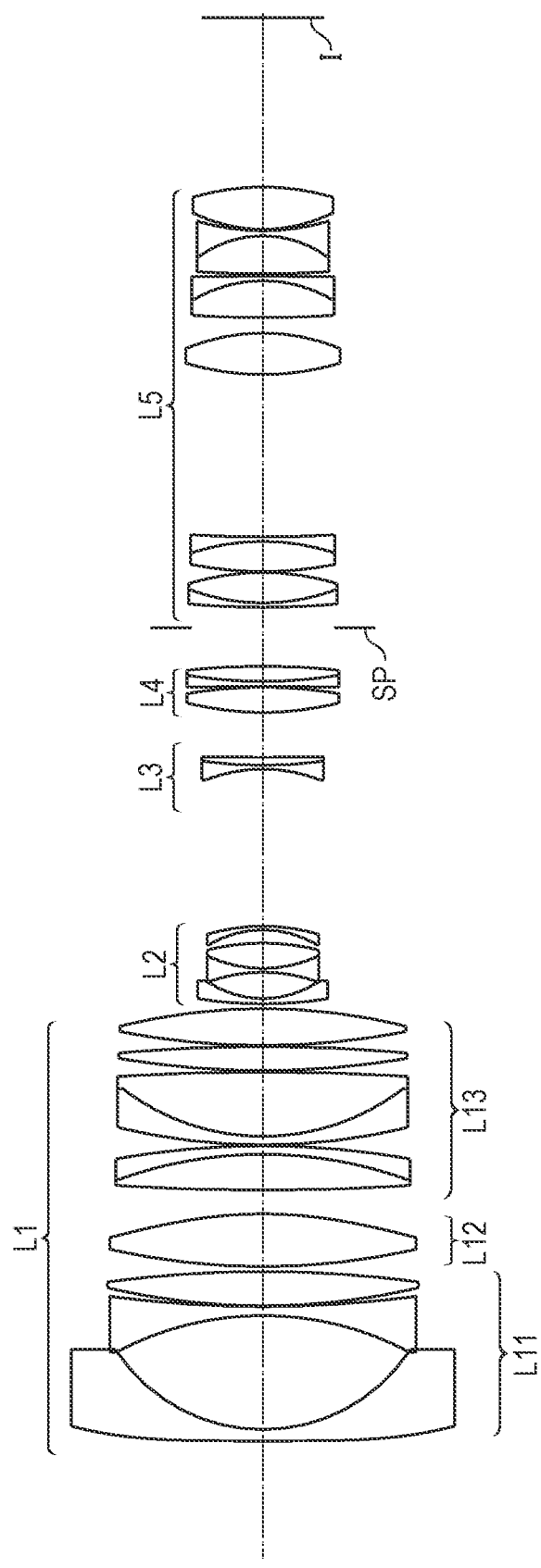
FIG. 9 is a lens cross-sectional view of the zoom lens according to Embodiment 5 at the wide angle end when focused on the object at infinity.

FIG. 9 is a lens cross-sectional view of the zoom lens according to Embodiment 5 of the present invention when focused on an infinity object at the wide angle end. FIGS. 10A and 10B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 moves during zooming and has a positive refractive power. Reference numeral SP denotes an aperture stop. The fifth lens unit L5 moves during zooming and has a positive refractive power. An extender lens or the like for focal length conversion may be mounted in the fifth lens unit L5. Reference numeral I denotes an image plane, which corresponds to an imaging plane of an image pickup element (photoelectric conversion element such as CCD or CMOS) which receives an optical image formed by the zoom lens.

Embodiment 6

The zoom lens according to Embodiment 6 of the present invention has the following configuration in order from the object side to the image side. The zoom lens includes a first lens unit L1 having a positive refractive power which does not move for zooming, a second lens unit L2 having a negative refractive power which moves during zooming, a third lens unit L3 having a negative refractive power which moves during zooming, a fourth lens unit L4 having a negative refractive power which moves during zooming, a fifth lens unit L5 having a positive refractive power which moves during zooming, an aperture stop SP, and a sixth lens unit L6 which is a final lens unit having a positive refractive power for forming an image.

Figure 11:
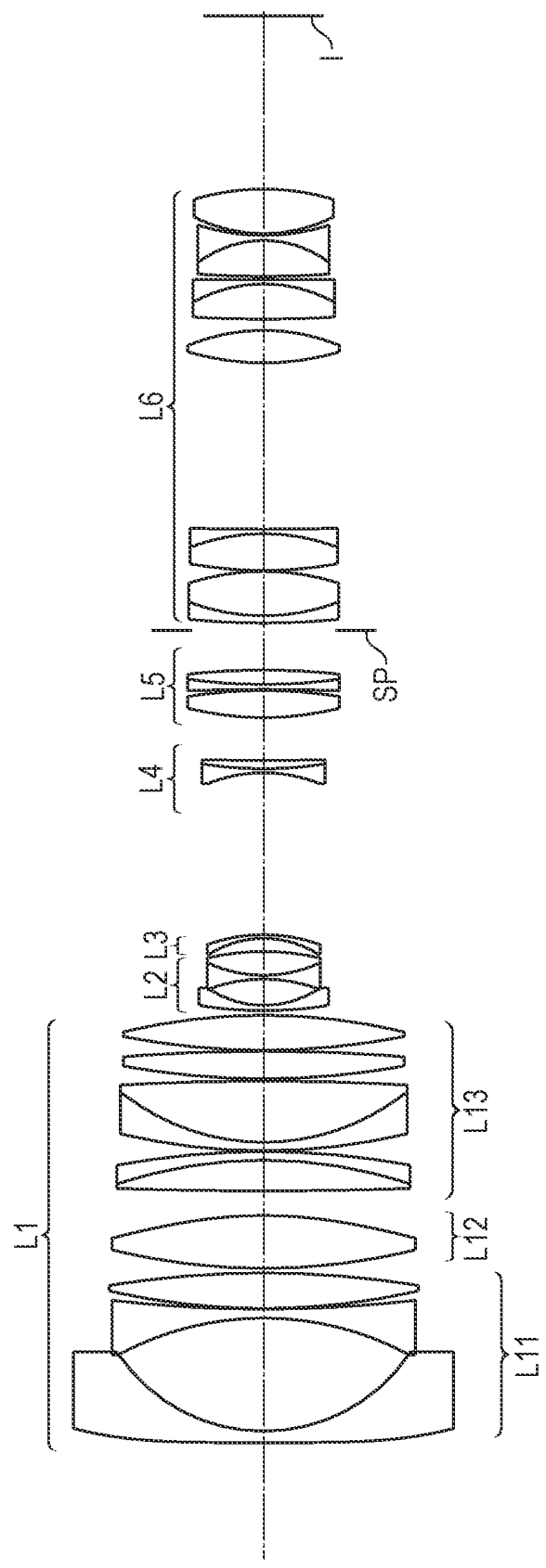
FIG. 11 is a lens cross-sectional view of the zoom lens according to Embodiment 6 at the wide angle end when focused on the object at infinity.
Figure 12A:
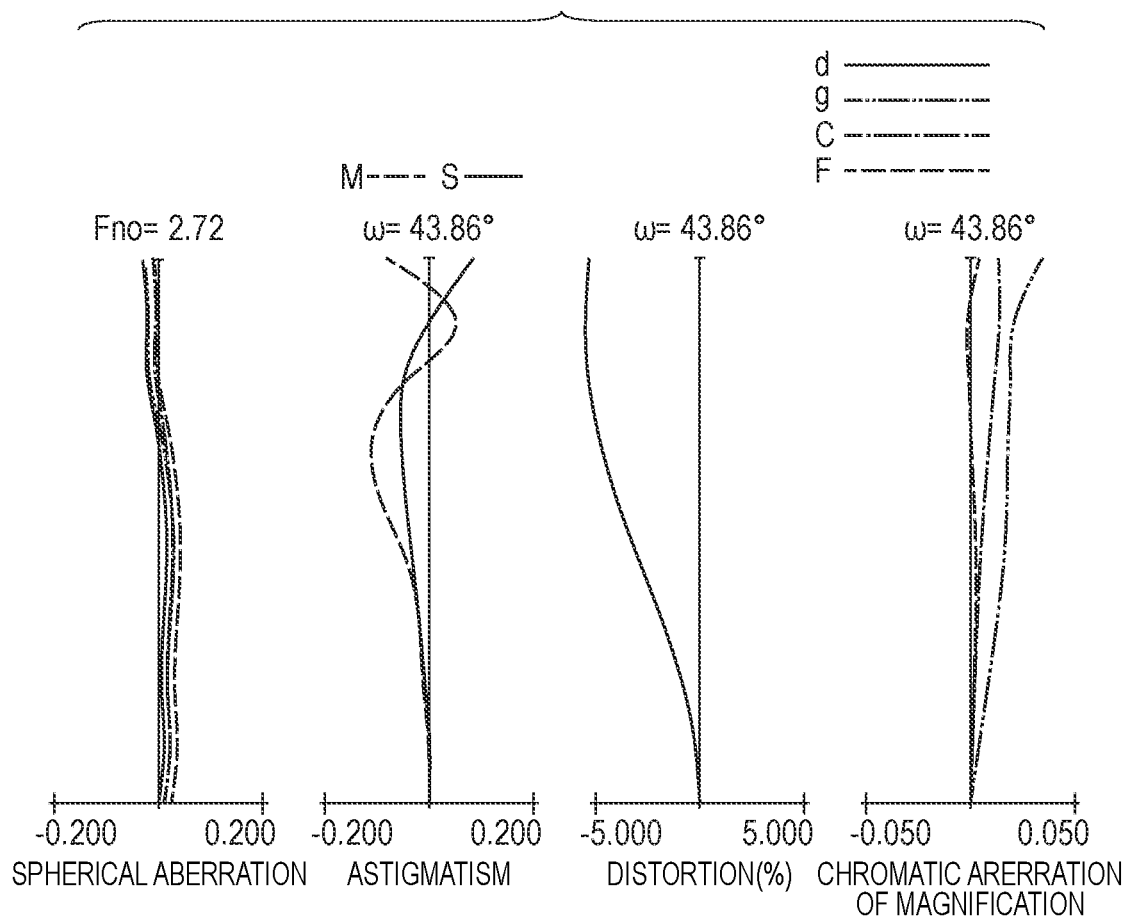
FIG. 12A is an aberration diagram of the zoom lens according to Embodiment 6 at the wide angle end when focused on the object at infinity.
Figure 12B:
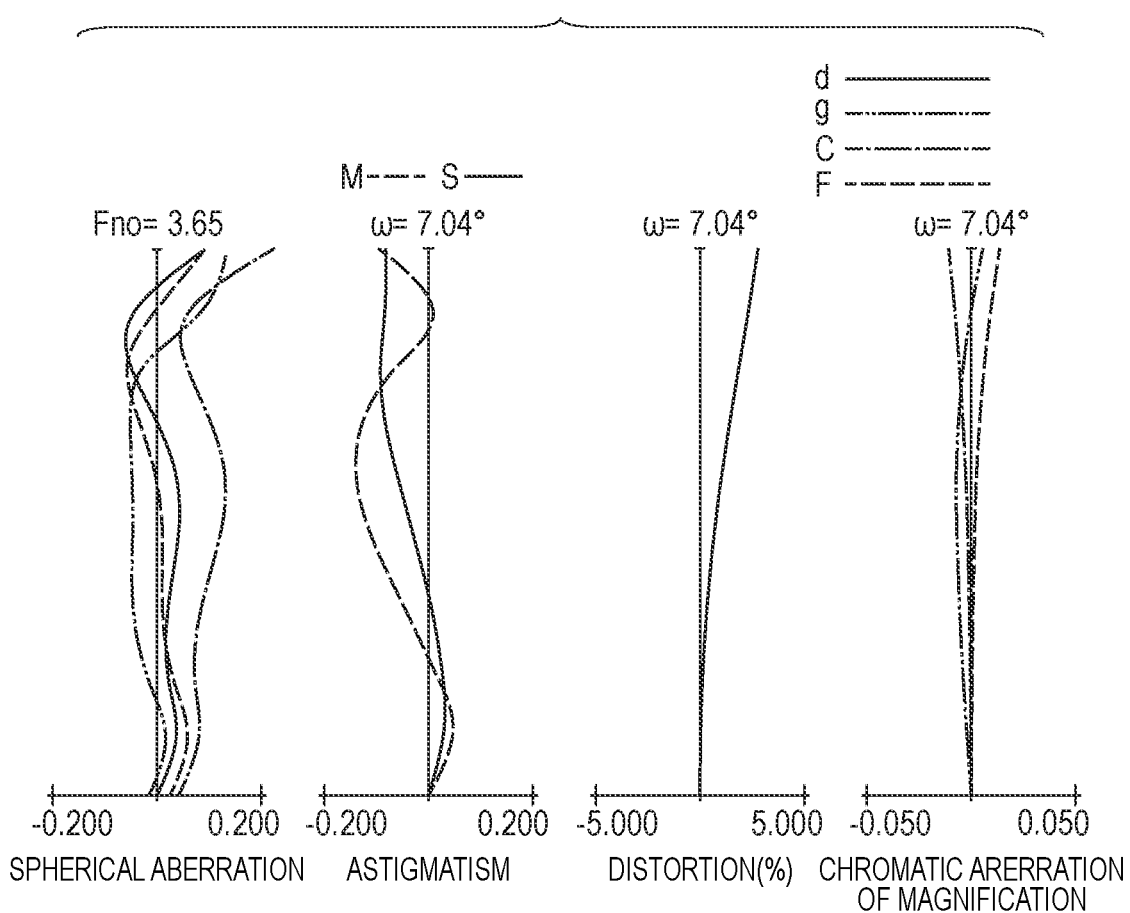
FIG. 12B is an aberration diagram of the zoom lens according to Embodiment 6 at the telephoto end when focused on the object at infinity.

FIG. 11 is a lens cross-sectional view of the zoom lens according to Embodiment 6 of the present invention when focused on an infinity object at the wide angle end. FIGS. 12A and 12B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 moves during zooming and has a negative refractive power. The fifth lens unit L5 moves during zooming and has a positive refractive power. Reference numeral SP denotes an aperture stop. The sixth lens unit L6 is a lens unit having a positive refractive power which does not move for zooming. An extender lens or the like for focal length conversion may be mounted in the sixth lens unit L6. Reference numeral I denotes an image plane, which corresponds to an imaging plane of an image pickup element (photoelectric conversion element such as CCD or CMOS) which receives an optical image formed by the zoom lens.

Embodiment 7

The zoom lens according to Embodiment 7 of the present invention has the following configuration in order from the object side to the image side. The zoom lens includes a first lens unit L1 having a positive refractive power which does not move for zooming, a second lens unit L2 having a negative refractive power which moves for zooming, a third lens unit L3 having a negative refractive power which moves for zooming, a fourth lens unit L4 having a positive refractive power which moves for zooming, an aperture stop SP, and a fifth lens unit L5 which is a final lens unit having a positive refractive power for forming an image.

Figure 13:
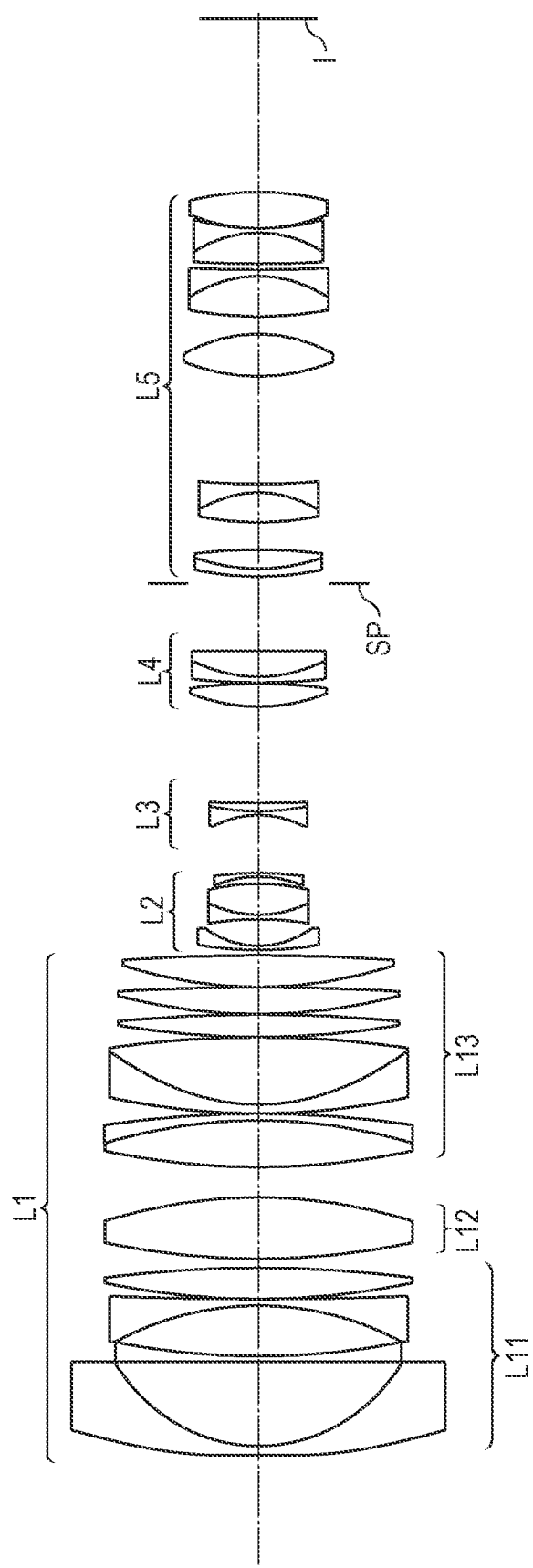
FIG. 13 is a lens cross-sectional view of the zoom lens according to Embodiment 7 at the wide angle end when focused on the object at infinity.
Figure 14A:
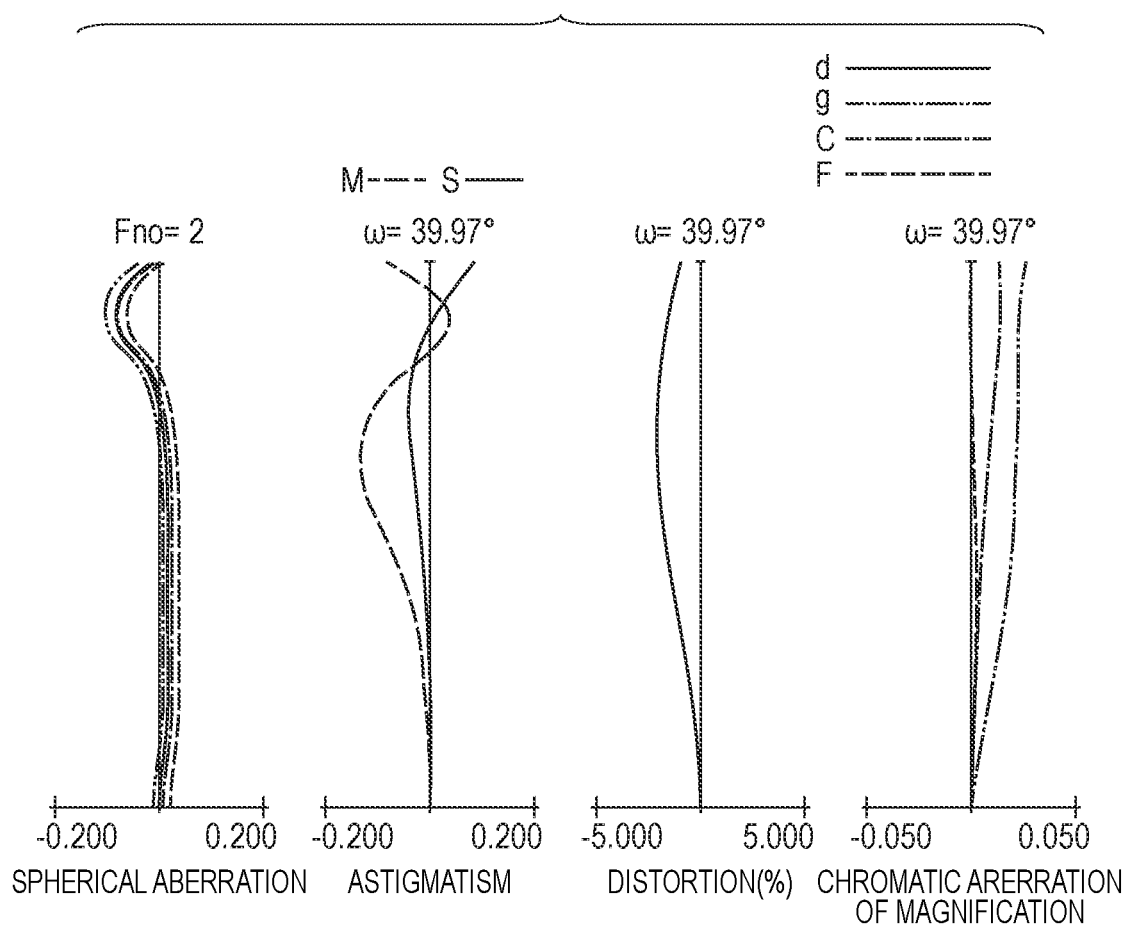
FIG. 14A is an aberration diagram of the zoom lens according to Embodiment 7 at the wide angle end when focused on the object at infinity.
Figure 14B:
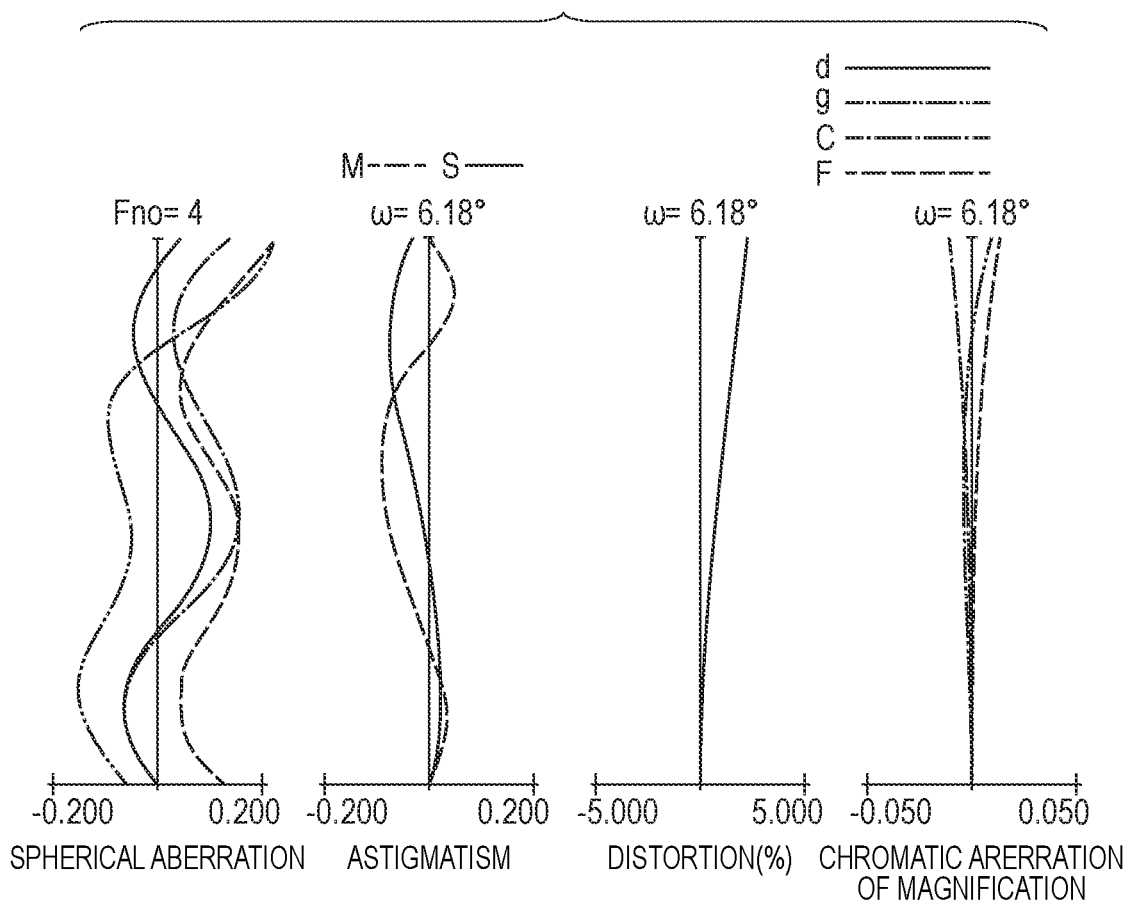
FIG. 14B is an aberration diagram of the zoom lens according to Embodiment 7 at the telephoto end when focused on the object at infinity.

FIG. 13 is a lens cross-sectional view of the zoom lens according to Embodiment 7 of the present invention when focused on an infinity object at the wide angle end. FIGS. 14A and 14B are aberration diagrams when focusing on the infinity object at the wide angle end and when focusing on the infinity object at the telephoto end, respectively.

The first lens unit L1 does not move for zooming and has a positive refractive power. The first lens unit L1 includes, in order from the object side to the image side, a first lens subunit L11 having a negative refractive power, a second lens subunit L12 having a positive refractive power, and a third lens subunit L13 having a positive refractive power. The second lens subunit L12 is a focus lens unit which moves from the object side to the image side at the time of focus adjustment from infinity to a finite distance. The second lens unit L2 is a variator lens unit having a negative refractive power that moves toward the image side during zooming from the wide angle end to the telephoto end. The third lens unit L3 moves during zooming and has a negative refractive power. The fourth lens unit L4 moves during zooming and has a positive refractive power. Reference numeral SP denotes an aperture stop. The fifth lens unit L5 is a lens unit having a positive refractive power which does not move for zooming. An extender lens or the like for focal length conversion may be mounted in the fifth lens unit L5. Reference numeral I denotes an image plane, which corresponds to an imaging plane of an image pickup element (photoelectric conversion element such as CCD or CMOS) which receives an optical image formed by the zoom lens.

Next, Numerical Embodiments 1 to 7 corresponding to Embodiments 1 to 7 of the present invention will be described. In each numerical embodiment, i denotes the order of the surfaces from the object side. Ri denotes a radius of curvature of the i-th lens surface in order from the object side to the image side, di denotes a lens thickness or an air interval between the i-th lens surface and the (i+1)-th lens surface in order from the object side to the image side, and ndi, vdi and θgFi denote a refractive index (d-line), an Abbe number (d-line reference), and a partial dispersion ratio (g-line and F-line reference) of a material of a lens located between the i-th lens surface and the (i+1)-th lens surface in order from the object side. Reference symbol BF denotes a back focus, which indicates a distance in terms of air from the last lens surface to the image surface. The total lens length is a value obtained by adding a back focus to a distance from the first lens surface to the last lens surface.

The aspheric shape is given by the following expression, where X axis is the optical axis direction, H axis is the direction perpendicular to the optical axis, the traveling direction of light is positive, R is the radius of paraxial curvature, k is a conic constant, and A3, A4, A5, A6, A7, A8, A9, A10, A11, A12, A13, A14, A15 and A16 are aspheric coefficients.

$$X = \frac{H^2/R}{1 + \sqrt{1 - (1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

In each aspherical shape, [e-X] means [×10$^{-X}$]. In addition to specifications such as a focal length and an F-number, a half angle of view of the entire zoom lens system is shown. Each lens unit data indicates the focal length of each lens unit. A portion where the distance d between the optical surfaces is "(variable)" changes during zooming, and another table shows the distance between the surfaces according to the focal length.

Numerical Embodiment 1

| Unit mm | | | | | |
|---|---|---|---|---|---|
| Surface data | | | | | |
| Surface number | r | d | nd | vd | θgF |
| 1* | 4757.030 | 2.80 | 1.80100 | 35.0 | 0.5864 |
| 2 | 43.063 | 27.48 | | | |
| 3 | −75.597 | 2.20 | 1.63854 | 55.4 | 0.5484 |
| 4 | 239.886 | 0.15 | | | |
| 5 | 157.499 | 7.69 | 1.95906 | 17.5 | 0.6598 |
| 6 | −383.207 | 1.13 | | | |
| 7 | 200.472 | 13.03 | 1.53775 | 74.7 | 0.5392 |
| 8* | −92.576 | 5.51 | | | |

-continued

| | Unit mm | | | | |
|---|---|---|---|---|---|
| 9 | 270.694 | 10.71 | 1.48749 | 70.2 | 0.5300 |
| 10 | -95.188 | 2.10 | 1.84666 | 23.8 | 0.6205 |
| 11 | -199.911 | 0.20 | | | |
| 12 | 145.369 | 2.10 | 1.80518 | 25.4 | 0.6161 |
| 13 | 56.865 | 13.53 | 1.43875 | 94.7 | 0.5340 |
| 14 | -1365.080 | 0.20 | | | |
| 15 | 206.147 | 6.00 | 1.43387 | 95.1 | 0.5373 |
| 16 | -334.432 | 0.20 | | | |
| 17 | 186.419 | 8.81 | 1.76385 | 48.5 | 0.5589 |
| 18 | -138.559 | (variable) | | | |
| 19* | 113.971 | 1.25 | 2.00100 | 29.1 | 0.5997 |
| 20 | 24.186 | 6.46 | | | |
| 21 | -41.222 | 0.90 | 1.59522 | 67.7 | 0.5442 |
| 22 | 30.642 | 6.03 | 1.85478 | 24.8 | 0.6122 |
| 23 | -62.383 | 3.17 | | | |
| 24 | -25.353 | 0.90 | 1.83481 | 42.7 | 0.5648 |
| 25 | -44.360 | (variable) | | | |
| 26 | -37.021 | 0.90 | 1.60300 | 65.4 | 0.5401 |
| 27 | 98.137 | 2.03 | 1.85478 | 24.8 | 0.6122 |
| 28 | 728.324 | (variable) | | | |
| 29* | 70.998 | 6.13 | 1.90525 | 35.0 | 0.5848 |
| 30 | -103.934 | 0.20 | | | |
| 31 | -315.843 | 1.20 | 1.95375 | 32.3 | 0.5905 |
| 32 | 166.347 | 3.47 | 1.61800 | 63.3 | 0.5441 |
| 33 | -137.368 | (variable) | | | |
| 34(stop) | ∞ | 1.80 | | | |
| 35 | 168.020 | 1.80 | 2.00100 | 29.1 | 0.5997 |
| 36 | 49.624 | 8.61 | 1.49700 | 81.5 | 0.5375 |
| 37 | -58.231 | 0.20 | | | |
| 38 | 88.195 | 6.21 | 1.51633 | 64.1 | 0.5353 |
| 39 | -53.581 | 2.00 | 1.83481 | 42.7 | 0.5648 |
| 40 | 243.630 | 41.99 | | | |
| 41 | 64.451 | 8.16 | 1.43875 | 94.7 | 0.5340 |
| 42 | -49.102 | 4.20 | | | |
| 43 | 255.432 | 7.95 | 1.80810 | 22.8 | 0.6307 |
| 44 | -35.562 | 1.10 | 2.00100 | 29.1 | 0.5997 |
| 45 | -1466.352 | 1.00 | | | |
| 46 | 161.235 | 10.33 | 1.51742 | 52.4 | 0.5564 |
| 47 | -26.752 | 1.20 | 1.89190 | 37.1 | 0.5780 |
| 48 | 51.269 | 0.72 | | | |
| 49 | 37.558 | 10.15 | 1.48749 | 70.2 | 0.5300 |
| 50 | -58.875 | 42.54 | | | |
| Image plane | ∞ | | | | |

Aspherical data

1st surface
K = -2.00000e+00 A 4 = 9.46087e-07 A 6 = 1.98046e-09 A 8 = 6.52397e-12 A10 = 8.28901e-15 A12 = -1.35643e-19 A14 = -1.86398e-21 A16 = -5.54763e-26
A 3 = -1.81264e-06 A 5 = -2.33898e-08 A 7 = -1.25328e-10 A 9 = -2.69889e-13 A11 = -1.52146e-16 A13 = 8.26328e-20 A15 = 1.72135e-23

8th surface
K = -1.02997e+00 A 4 = 5.48630e-07 A 6 = 2.34979e-10 A 8 = -1.89359e-15 A10 = -6.91188e-16 A12 = -7.25113e-20
A 3 = -3.10939e-07 A 5 = -1.89555e-09 A 7 = -1.00407e-11 A 9 = 1.71125e-14 A11 = 1.12862e-17

19th surface
K = -2.00013e+00 A 4 = 4.92053e-06 A 6 = -5.35701e-08 A 8 = -2.79944e-09 A10 = -1.33097e-11 A12 = -3.74615e-15
A 3 = -1.29064e-06 A 5 = -9.34903e-08 A 7 = 1.78894e-08 A 9 = 2.53904e-10 A11 = 3.63938e-13

29th surface
K = 8.99851e-01 A 4 = -2.76907e-06 A 6 = -1.06240e-07 A 8 = -2.88426e-09 A10 = -1.28512e-11 A12 = 1.83249e-15 A14 = 1.77924e-17 A16 = 3.66574e-21
A 3 = -3.97104e-07 A 5 = 2.76818e-07 A 7 = 2.21858e-08 A 9 = 2.43469e-10 A11 = 3.46270e-13 A13 = -4.90518e-16 A15 = -3.48843e-19

Various data
Zoom ratio 7.79

| | Wide angle end | Middle | Telephoto end |
|---|---|---|---|
| Focal length | 15.40 | 45.00 | 120.00 |
| F-number | 2.72 | 2.71 | 3.65 |
| Half angle of view | 43.86 | 18.21 | 7.03 |
| Image height | 14.80 | 14.80 | 14.80 |

-continued

| Unit mm | | | |
|---|---|---|---|
| Total lens length | 347.55 | 347.55 | 347.55 |
| BF | 42.54 | 42.54 | 42.54 |
| d18 | 1.15 | 37.22 | 55.04 |
| d25 | 39.95 | 4.59 | 3.36 |
| d28 | 10.52 | 14.59 | 0.79 |
| d33 | 9.50 | 4.72 | 1.92 |

| Zoom lens unit data | | |
|---|---|---|
| Unit | Leading surface | Focal length |
| 1 | 1 | 46.81 |
| 2 | 19 | −24.89 |
| 3 | 26 | −67.11 |
| 4 | 29 | 49.01 |
| 5 | 34 | 96.11 |

Numerical Embodiment 2

| Unit mm | | | | | |
|---|---|---|---|---|---|
| Surface data | | | | | |
| Surface number | r | d | nd | vd | θgF |
| 1* | −89413.671 | 2.80 | 1.79360 | 37.1 | 0.5828 |
| 2 | 43.169 | 29.32 | | | |
| 3 | −85.464 | 2.20 | 1.64000 | 60.1 | 0.5370 |
| 4 | 207.517 | 0.15 | | | |
| 5 | 149.813 | 8.99 | 1.92286 | 18.9 | 0.6495 |
| 6 | −350.031 | 1.13 | | | |
| 7 | 188.369 | 13.87 | 1.49700 | 81.5 | 0.5375 |
| 8* | −94.494 | 10.34 | | | |
| 9 | 328.251 | 9.69 | 1.48749 | 70.2 | 0.5300 |
| 10 | −147.291 | 2.10 | 1.84666 | 23.8 | 0.6205 |
| 11 | −183.332 | 0.20 | | | |
| 12 | 359.780 | 2.10 | 1.84666 | 23.8 | 0.6205 |
| 13 | 59.688 | 13.61 | 1.49700 | 81.5 | 0.5375 |
| 14 | −470.525 | 0.20 | | | |
| 15 | 187.907 | 9.01 | 1.43875 | 94.7 | 0.5340 |
| 16 | −183.294 | 2.00 | | | |
| 17 | 137.951 | 10.99 | 1.76385 | 48.5 | 0.5589 |
| 18 | −164.814 | (variable) | | | |
| 19* | 111.441 | 1.25 | 2.00100 | 29.1 | 0.5997 |
| 20 | 24.326 | 6.93 | | | |
| 21 | −36.958 | 0.90 | 1.59522 | 67.7 | 0.5442 |
| 22 | 30.033 | 8.62 | 1.85478 | 24.8 | 0.6122 |
| 23 | −52.167 | 3.60 | | | |
| 24 | −26.178 | 0.90 | 1.83481 | 42.7 | 0.5648 |
| 25 | −62.620 | (variable) | | | |
| 26 | −37.952 | 0.90 | 1.60300 | 65.4 | 0.5401 |
| 27 | 102.754 | 2.05 | 1.85478 | 24.8 | 0.6122 |
| 28 | 3587.812 | (variable) | | | |
| 29* | 57.540 | 8.76 | 1.90525 | 35.0 | 0.5848 |
| 30 | −123.886 | 0.20 | | | |
| 31 | 717.433 | 1.20 | 1.95375 | 32.3 | 0.5905 |
| 32 | 62.604 | 5.99 | 1.61800 | 63.3 | 0.5441 |
| 33 | −441.313 | 3.00 | | | |
| 34(stop) | ∞ | (variable) | | | |
| 35 | 165.568 | 1.80 | 2.00100 | 29.1 | 0.5997 |
| 36 | 54.607 | 7.28 | 1.49700 | 81.5 | 0.5375 |
| 37 | −61.491 | 0.90 | | | |
| 38 | 102.223 | 9.26 | 1.51633 | 64.1 | 0.5353 |
| 39 | −44.173 | 1.11 | 1.83481 | 42.7 | 0.5648 |
| 40 | 287.865 | 37.96 | | | |
| 41 | 57.232 | 10.58 | 1.43875 | 94.7 | 0.5340 |
| 42 | −48.113 | 4.16 | | | |
| 43 | 157.256 | 8.88 | 1.80810 | 22.8 | 0.6307 |
| 44 | −30.967 | 1.10 | 2.00100 | 29.1 | 0.5997 |
| 45 | 451.915 | 1.00 | | | |
| 46 | 176.815 | 8.41 | 1.51742 | 52.4 | 0.5564 |

-continued

| Unit mm | | | | |
|---|---|---|---|---|
| 47 | −25.166 | 1.20 | 1.89190 | 37.1 | 0.5780 |
| 48 | 58.270 | 0.91 | | | |
| 49 | 37.662 | 11.12 | 1.48749 | 70.2 | 0.5300 |
| 50 | −58.875 | 40.24 | | | |
| Image plane | ∞ | | | | |

Aspherical data

1st surface
K = 3.46351e+06 A 4 = 8.89298e−07 A 6 = 2.22014e−09 A 8 = 6.64596e−12 A10 = 8.25887e−15 A12 = −1.29611e−19 A14 = −1.86084e−21 A16 = −5.65689e−26
A 3 = −1.04177e−06 A 5 = −2.67053e−08 A 7 = −1.32296e−10 A 9 = −2.69735e−13 A11 = −1.52521e−16 A13 = 8.27153e−20 A15 = 1.72111e−23
8th surface
K = −4.11347e−01 A 4 = 7.73068e−07 A 6 = 1.98062e−10 A 8 = −3.68208e−13 A10 = −1.32661e−15 A12 = −1.29935e−19
A 3 = 7.84263e−08 A 5 = −1.05783e−09 A 7 = −7.44048e−12 A 9 = 3.86879e−14 A11 = 2.08018e−17
19th surface
K = −1.63671e+01 A 4 = 5.01302e−06 A 6 = −4.33711e−08 A 8 = −2.43207e−09 A10 = −1.48570e−11 A12 = −4.67044e−15
A 3 = 3.47434e−07 A 5 = 4.42491e−08 A 7 = 1.34016e−08 A 9 = 2.54880e−10 A11 = 4.35183e−13
29th surface
K = −5.68897e−01 A 4 = −2.11632e−06 A 6 = −1.12321e−07 A 8 = −2.93486e−09 A10 = −1.28336e−11 A12 = 1.89637e−15 A14 = 1.73771e−17 A16 = 2.45582e−21
A 3 = −9.14979e−07 A 5 = 2.56470e−07 A 7 = 2.32919e−08 A 9 = 2.42773e−10 A11 = 3.52411e−13 A13 = −5.09488e−16 A15 = −2.88355e−19

Various data
Zoom ratio 7.38

| | Wide angle end | Middle | Telephoto end |
|---|---|---|---|
| Focal length | 15.83 | 43.95 | 116.78 |
| F-number | 2.72 | 2.72 | 3.65 |
| Half angle of view | 43.07 | 18.61 | 7.22 |
| Image height | 14.80 | 14.80 | 14.80 |
| Total lens length | 360.75 | 360.75 | 360.75 |
| BF | 40.24 | 40.24 | 40.24 |
| d18 | 1.50 | 29.82 | 43.81 |
| d25 | 32.90 | 4.07 | 3.25 |
| d28 | 13.46 | 16.48 | 0.80 |
| d34 | 4.00 | 1.49 | 4.00 |

Zoom lens unit data

| Unit | Leading surface | Focal length |
|---|---|---|
| 1 | 1 | 39.01 |
| 2 | 19 | −22.42 |
| 3 | 26 | −73.20 |
| 4 | 29 | 49.90 |
| 5 | 35 | 99.64 |

Numerical Embodiment 3

| Unit mm | | | | |
|---|---|---|---|---|
| Surface data | | | | |
| Surface number | r | d | nd | vd | θgF |
| 1* | 802.648 | 2.80 | 1.80100 | 35.0 | 0.5864 |
| 2 | 42.334 | 28.82 | | | |
| 3 | −70.803 | 2.20 | 1.63854 | 55.4 | 0.5484 |
| 4 | 253.576 | 0.15 | | | |
| 5 | 162.711 | 7.81 | 1.95906 | 17.5 | 0.6598 |
| 6 | −378.441 | 1.38 | | | |

-continued

| Unit mm | | | | | |
|---|---|---|---|---|---|
| 7 | 193.823 | 15.69 | 1.53775 | 74.7 | 0.5392 |
| 8* | −92.436 | 6.03 | | | |
| 9 | 331.302 | 11.96 | 1.48749 | 70.2 | 0.5300 |
| 10 | −88.518 | 2.10 | 1.84666 | 23.8 | 0.6205 |
| 11 | −167.390 | 0.20 | | | |
| 12 | 129.429 | 2.10 | 1.80518 | 25.4 | 0.6161 |
| 13 | 56.391 | 11.08 | 1.43875 | 94.7 | 0.5340 |
| 14 | 282.158 | 0.20 | | | |
| 15 | 164.743 | 7.14 | 1.43387 | 95.1 | 0.5373 |
| 16 | −264.424 | 0.20 | | | |
| 17 | 216.988 | 8.39 | 1.76385 | 48.5 | 0.5589 |
| 18 | −139.131 | (variable) | | | |
| 19* | 67.940 | 1.25 | 2.00100 | 29.1 | 0.5997 |
| 20 | 23.570 | 7.12 | | | |
| 21 | −41.938 | 0.90 | 1.59522 | 67.7 | 0.5442 |
| 22 | 29.876 | 5.75 | 1.85478 | 24.8 | 0.6122 |
| 23 | −80.323 | 2.45 | | | |
| 24 | −25.598 | 0.90 | 1.83481 | 42.7 | 0.5648 |
| 25 | −44.148 | (variable) | | | |
| 26 | −38.333 | 0.90 | 1.60300 | 65.4 | 0.5401 |
| 27 | 110.410 | 3.01 | 1.85478 | 24.8 | 0.6122 |
| 28 | 1191.968 | (variable) | | | |
| 29* | 72.032 | 5.30 | 1.90525 | 35.0 | 0.5848 |
| 30 | −145.830 | 0.20 | | | |
| 31 | −314.945 | 1.20 | 1.95375 | 32.3 | 0.5905 |
| 32 | 447.811 | 3.56 | 1.61800 | 63.3 | 0.5441 |
| 33 | −111.378 | (variable) | | | |
| 34(stop) | ∞ | (variable) | | | |
| 35 | 167.521 | 1.10 | 2.00100 | 29.1 | 0.5997 |
| 36 | 47.984 | 8.31 | 1.49700 | 81.5 | 0.5375 |
| 37 | −65.103 | 0.57 | | | |
| 38 | 97.838 | 6.56 | 1.51633 | 64.1 | 0.5353 |
| 39 | −51.367 | 1.10 | 1.83481 | 42.7 | 0.5648 |
| 40 | 520.552 | 46.29 | | | |
| 41 | 71.881 | 8.00 | 1.43875 | 94.7 | 0.5340 |
| 42 | −50.471 | 4.20 | | | |
| 43 | 109.502 | 9.45 | 1.80810 | 22.8 | 0.6307 |
| 44 | −37.460 | 1.10 | 2.00100 | 29.1 | 0.5997 |
| 45 | 116.922 | 0.99 | | | |
| 46 | 86.066 | 11.09 | 1.51742 | 52.4 | 0.5564 |
| 47 | −25.435 | 1.20 | 1.89190 | 37.1 | 0.5780 |
| 48 | 52.611 | 1.94 | | | |
| 49 | 39.946 | 8.80 | 1.48749 | 70.2 | 0.5300 |
| 50 | −50.176 | 40.10 | | | |
| Image plane | ∞ | | | | |

Aspherical data

1st surface
K = −1.07693e+03 A 4 = 1.12115e−06 A 6 = 1.91940e−09 A 8 = 6.59131e−12 A10 = 8.27377e−15 A12 = −1.35783e−19 A14 = −1.86448e−21 A16 = −5.53455e−26
A 3 = −1.50134e−06 A 5 = −2.59911e−08 A 7 = −1.25281e−10 A 9 = −2.69925e−13 A11 = −1.52237e−16 A13 = 8.26987e−20 A15 = 1.72102e−23
8th surface
K = −5.61776e−01 A 4 = 6.01042e−07 A 6 = 4.01879e−10 A 8 = 2.18544e−13 A10 = −8.57671e−16 A12 = −1.01545e−19
A 3 = −2.02504e−07 A 5 = −3.58450e−09 A 7 = −1.86015e−11 A 9 = 1.73697e−14 A11 = 1.51797e−17
19th surface
K = −2.92314e+00 A 4 = 5.28329e−06 A 6 = −5.13287e−08 A 8 = −2.68675e−09 A10 = −1.33504e−11 A12 = −3.61948e−15
A 3 = −2.04612e−06 A 5 = −8.07752e−08 A 7 = 1.71289e−08 A 9 = 2.48784e−10 A11 = 3.67585e−13
29th surface
K = 1.85043e+00 A 4 = −2.62570e−06 A 6 = −1.00120e−07 A 8 = −2.83515e−09 A10 = −1.28862e−11 A12 = 1.83187e−15 A14 = 1.77472e−17 A16 = 3.41386e−21
A 3 = 7.03908e−08 A 5 = 2.56255e−07 A 7 = 2.14014e−08 A 9 = 2.42290e−10 A11 = 3.48440e−13 A13 = −4.91305e−16 A15 = −3.42057e−19

-continued

| Unit mm | | | |
|---|---|---|---|
| Various data Zoom ratio 7.47 | | | |
| | Wide angle end | Middle | Telephoto end |
| Focal length | 15.91 | 45.76 | 118.84 |
| F-number | 2.72 | 2.72 | 3.65 |
| Half angle of view | 42.93 | 17.92 | 7.10 |
| Image height | 14.80 | 14.80 | 14.80 |
| Total lens length | 356.08 | 356.08 | 356.08 |
| d18 | 1.50 | 38.75 | 57.16 |
| d25 | 44.44 | 6.63 | 2.19 |
| d28 | 11.81 | 16.16 | 2.81 |
| d33 | 4.71 | 0.59 | 0.50 |
| d34 | 2.00 | 2.34 | 1.81 |

| Zoom lens unit data | | |
|---|---|---|
| Unit | Leading surface | Focal length |
| 1 | 1 | 48.43 |
| 2 | 19 | −26.49 |
| 3 | 26 | −70.58 |
| 4 | 29 | 49.92 |
| 5 | 34 | ∞ |
| 6 | 35 | 109.30 |

Numerical Embodiment 4

| Unit mm | | | | | |
|---|---|---|---|---|---|
| Surface data | | | | | |
| Surface number | r | d | nd | vd | θgF |
| 1* | 6717.361 | 2.80 | 1.80100 | 35.0 | 0.5864 |
| 2 | 43.080 | 27.75 | | | |
| 3 | −76.176 | 2.20 | 1.63854 | 55.4 | 0.5484 |
| 4 | 241.633 | 0.15 | | | |
| 5 | 158.849 | 7.85 | 1.95906 | 17.5 | 0.6598 |
| 6 | −380.261 | 1.13 | | | |
| 7 | 198.447 | 13.49 | 1.53775 | 74.7 | 0.5392 |
| 8* | −92.893 | 5.48 | | | |
| 9 | 259.763 | 10.83 | 1.48749 | 70.2 | 0.5300 |
| 10 | −95.738 | 2.10 | 1.84666 | 23.8 | 0.6205 |
| 11 | −197.444 | 0.20 | | | |
| 12 | 144.348 | 2.10 | 1.80518 | 25.4 | 0.6161 |
| 13 | 56.582 | 14.65 | 1.43875 | 94.7 | 0.5340 |
| 14 | −1244.830 | 0.23 | | | |
| 15 | 206.292 | 6.00 | 1.43387 | 95.1 | 0.5373 |
| 16 | −305.416 | 0.20 | | | |
| 17 | 184.879 | 8.81 | 1.76385 | 48.5 | 0.5589 |
| 18 | −141.503 | (variable) | | | |
| 19 | 167.429 | 0.75 | 1.43875 | 94.7 | 0.5340 |
| 20 | 137.803 | (variable) | | | |
| 21* | 114.833 | 1.25 | 2.00100 | 29.1 | 0.5997 |
| 22 | 24.474 | 6.38 | | | |
| 23 | −42.263 | 0.90 | 1.59522 | 67.7 | 0.5442 |
| 24 | 30.711 | 6.01 | 1.85478 | 24.8 | 0.6122 |
| 25 | −64.041 | 3.28 | | | |
| 26 | −25.593 | 0.90 | 1.83481 | 42.7 | 0.5648 |
| 27 | −44.434 | (variable) | | | |
| 28 | −36.740 | 0.90 | 1.60300 | 65.4 | 0.5401 |
| 29 | 95.097 | 2.06 | 1.85478 | 24.8 | 0.6122 |
| 30 | 620.857 | (variable) | | | |
| 31* | 70.616 | 6.23 | 1.90525 | 35.0 | 0.5848 |
| 32 | −102.845 | 0.20 | | | |
| 33 | −306.251 | 1.20 | 1.95375 | 32.3 | 0.5905 |
| 34 | 158.937 | 3.53 | 1.61800 | 63.3 | 0.5441 |
| 35 | −139.595 | (variable) | | | |

-continued

| Unit mm | | | | | |
|---|---|---|---|---|---|
| 36(stop) | ∞ | 1.80 | | | |
| 37 | 166.159 | 1.31 | 2.00100 | 29.1 | 0.5997 |
| 38 | 50.551 | 7.94 | 1.49700 | 81.5 | 0.5375 |
| 39 | −59.763 | 1.94 | | | |
| 40 | 88.990 | 6.26 | 1.51633 | 64.1 | 0.5353 |
| 41 | −53.141 | 1.35 | 1.83481 | 42.7 | 0.5648 |
| 42 | 245.485 | 40.51 | | | |
| 43 | 65.095 | 8.72 | 1.43875 | 94.7 | 0.5340 |
| 44 | −47.915 | 4.15 | | | |
| 45 | 258.388 | 6.86 | 1.80810 | 22.8 | 0.6307 |
| 46 | −35.273 | 1.10 | 2.00100 | 29.1 | 0.5997 |
| 47 | −1390.050 | 0.86 | | | |
| 48 | 156.334 | 10.11 | 1.51742 | 52.4 | 0.5564 |
| 49 | −26.964 | 1.20 | 1.89190 | 37.1 | 0.5780 |
| 50 | 50.413 | 0.51 | | | |
| 51 | 37.472 | 8.43 | 1.48749 | 70.2 | 0.5300 |
| 52 | −58.875 | 44.74 | | | |
| Image plane | ∞ | | | | |

Aspherical data

1st surface
K = 7.00480e+03 A 4 = 9.51609e−07 A 6 = 1.97580e−09 A 8 = 6.52069e−12 A10 = 8.28787e−15 A12 = −1.34742e−19 A14 = −1.86371e−21 A16 = −5.56733e−26
A 3 = −1.86549e−06 A 5 = −2.27145e−08 A 7 = −1.25197e−10 A 9 = −2.70010e−13 A11 = −1.52123e−16 A13 = 8.26404e−20 A15 = 1.72143e−23

8th surface
K = −9.83875e−01 A 4 = 5.58212e−07 A 6 = 2.33392e−10 A 8 = −1.03515e−14 A10 = −6.66003e−16 A12 = −6.91678e−20
A 3 = −3.49559e−07 A 5 = −1.88499e−09 A 7 = −9.76444e−12 A 9 = 1.68014e−14 A11 = 1.07709e−17

21th surface
K = −2.62554e+00 A 4 = 4.86589e−06 A 6 = −5.09761e−08 A 8 = −2.76680e−09 A10 = −1.34027e−11 A12 = −3.76425e−15
A 3 = −1.26397e−06 A 5 = −1.07426e−07 A 7 = 1.74468e−08 A 9 = 2.53890e−10 A11 = 3.66950e−13

31th surface
K = 1.08794e+00 A 4 = −2.82003e−06 A 6 = −1.06778e−07 A 8 = −2.88788e−09 A10 = −1.28476e−11 A12 = 1.81725e−15 A14 = 1.78620e−17 A16 = 3.62335e−21
A 3 = −5.01326e−07 A 5 = 2.75020e−07 A 7 = 2.22692e−08 A 9 = 2.43452e−10 A11 = 3.46348e−13 A13 = −4.90775e−16 A15 = −3.49718e−19

Various data
Zoom ratio 7.76

| | Wide angle end | Middle | Telephoto end |
|---|---|---|---|
| Focal length | 15.44 | 45.00 | 119.91 |
| F-number | 2.72 | 2.71 | 3.64 |
| Half angle of view | 43.78 | 18.21 | 7.04 |
| Image height | 14.80 | 14.80 | 14.80 |
| Total lens length | 346.95 | 346.95 | 346.95 |
| BF | 44.74 | 44.74 | 44.74 |
| d18 | 0.20 | 3.42 | 5.64 |
| d20 | 0.20 | 33.45 | 49.26 |
| d27 | 40.04 | 4.61 | 3.00 |
| d30 | 10.98 | 14.88 | 1.25 |
| d35 | 8.15 | 3.21 | 0.43 |

Zoom lens unit data

| Unit | Leading surface | Focal length |
|---|---|---|
| 1 | 1 | 45.44 |
| 2 | 19 | −1788.83 |
| 3 | 21 | −25.35 |
| 4 | 28 | −66.00 |
| 5 | 31 | 49.25 |
| 6 | 36 | 97.09 |

Numerical Embodiment 5

| | | Unit mm | | | |
|---|---|---|---|---|---|
| | | Surface data | | | |
| Surface number | r | d | nd | vd | θgF |
| 1* | 4285.116 | 2.80 | 1.80100 | 35.0 | 0.5864 |
| 2 | 43.111 | 28.21 | | | |
| 3 | −76.237 | 2.20 | 1.65160 | 58.5 | 0.5390 |
| 4 | 279.525 | 0.15 | | | |
| 5 | 164.506 | 8.53 | 1.92286 | 18.9 | 0.6495 |
| 6 | −281.537 | 1.19 | | | |
| 7 | 166.694 | 13.07 | 1.53775 | 74.7 | 0.5392 |
| 8* | −100.923 | 5.80 | | | |
| 9 | 531.347 | 8.90 | 1.49700 | 81.5 | 0.5375 |
| 10 | −103.890 | 2.10 | 1.84666 | 23.8 | 0.6205 |
| 11 | −201.170 | 0.20 | | | |
| 12 | 147.842 | 2.10 | 1.80518 | 25.4 | 0.6161 |
| 13 | 56.322 | 15.94 | 1.43875 | 94.7 | 0.5340 |
| 14 | −550.479 | 0.32 | | | |
| 15 | 207.639 | 6.00 | 1.43387 | 95.1 | 0.5373 |
| 16 | −372.693 | 0.20 | | | |
| 17 | 179.598 | 9.13 | 1.76385 | 48.5 | 0.5589 |
| 18 | −143.920 | (variable) | | | |
| 19* | 121.430 | 1.25 | 2.00100 | 29.1 | 0.5997 |
| 20 | 24.227 | 6.56 | | | |
| 21 | −38.267 | 0.90 | 1.59522 | 67.7 | 0.5442 |
| 22 | 31.414 | 6.27 | 1.85478 | 24.8 | 0.6122 |
| 23 | −55.567 | 3.29 | | | |
| 24 | −25.417 | 0.90 | 1.83481 | 42.7 | 0.5648 |
| 25 | −47.052 | (variable) | | | |
| 26 | −37.893 | 0.90 | 1.60300 | 65.4 | 0.5401 |
| 27 | 100.502 | 2.01 | 1.85478 | 24.8 | 0.6122 |
| 28 | 841.240 | (variable) | | | |
| 29* | 67.881 | 6.29 | 1.90525 | 35.0 | 0.5848 |
| 30 | −108.563 | 0.20 | | | |
| 31 | −685.341 | 1.20 | 1.95375 | 32.3 | 0.5905 |
| 32 | 112.917 | 3.79 | 1.61800 | 63.3 | 0.5441 |
| 33 | −167.241 | (variable) | | | |
| 34(stop) | ∞ | (variable) | | | |
| 35 | 192.230 | 1.10 | 2.00100 | 29.1 | 0.5997 |
| 36 | 50.304 | 7.56 | 1.49700 | 81.5 | 0.5375 |
| 37 | −60.931 | 0.20 | | | |
| 38 | 88.541 | 7.48 | 1.51633 | 64.1 | 0.5353 |
| 39 | −55.347 | 1.10 | 1.83481 | 42.7 | 0.5648 |
| 40 | 301.445 | 40.10 | | | |
| 41 | 64.523 | 10.29 | 1.43875 | 94.7 | 0.5340 |
| 42 | −48.277 | 3.78 | | | |
| 43 | 255.324 | 9.15 | 1.80810 | 22.8 | 0.6307 |
| 44 | 32.994 | 1.10 | 2.00100 | 29.1 | 0.5997 |
| 45 | −867.994 | 0.56 | | | |
| 46 | 246.285 | 9.44 | 1.51742 | 52.4 | 0.5564 |
| 47 | −26.537 | 1.20 | 1.89190 | 37.1 | 0.5780 |
| 48 | 55.100 | 0.33 | | | |
| 49 | 37.785 | 10.52 | 1.48749 | 70.2 | 0.5300 |
| 50 | −58.875 | (variable) | | | |
| Image plane | ∞ | | | | |

Aspherical data

1st surface
K = −1.23333e+04 A 4 = 1.03878e−06 A 6 = 2.03662e−09 A 8 = 6.59393e−12 A10 = 8.26671e−15 A12 = −1.36697e−19 A14 = −1.86118e−21 A16 = −5.61574e−26
A 3 = −1.92338e−06 A 5 = −2.62098e−08 A 7 = −1.28131e−10 A 9 = −2.69365e−13 A11 = −1.52440e−16 A13 = 8.27659e−20 A15 = 1.71979e−23

8th surface
K = −1.36638e+00 A 4 = 5.95820e−07 A 6 = 1.55305e−10 A 8 = −2.13020e−13 A10 = −6.36877e−16 A12 = −5.69187e−20
A 3 = −3.49728e−07 A 5 = −1.84810e−09 A 7 = −4.73093e−12 A 9 = 1.98005e−14 A11 = 9.42489e−18

19th surface
K = 6.80194e+00 A 4 = 4.32994e−06 A 6 = −5.15073e−08 A 8 = −2.76282e−09 A10 = −1.33228e−11 A12 = −3.70494e−15
A 3 = −8.34104e−07 A 5 = −9.58806e−08 A 7 = 1.75022e−08 A 9 = 2.52526e−10 A11 = 3.64692e−13

29th surface

-continued

| Unit mm |
|---|

K = 1.17021e+00 A 4 = −2.88586e−06 A 6 = −1.05443e−07 A 8 = −2.87726e−09
A10 = −1.28443e−11 A12 = 1.85569e−15 A14 = 1.77961e−17 A16 = 3.70102e−21
A 3 = −5.54569e−07 A 5 = 2.61702e−07 A 7 = 2.21624e−08 A 9 = 2.42839e−10 A11 = 3.46692e−13 A13 = −4.91497e−16 A15 = −3.50323e−19

| Various data Zoom ratio 7.92 | | | |
|---|---|---|---|
| | Wide angle end | Middle | Telephoto end |
| Focal length | 15.36 | 44.88 | 121.73 |
| F-number | 2.72 | 2.71 | 3.65 |
| Half angle of view | 43.93 | 18.25 | 6.93 |
| Image height | 14.80 | 14.80 | 14.80 |
| Total lens length | 351.73 | 351.73 | 351.73 |
| BF | 41.87 | 42.10 | 42.56 |
| d18 | 1.19 | 36.22 | 53.53 |
| d25 | 38.82 | 4.06 | 3.05 |
| d28 | 11.04 | 15.32 | 0.80 |
| d33 | 9.49 | 4.96 | 3.18 |
| d34 | 5.00 | 4.77 | 4.31 |
| d50 | 41.87 | 42.10 | 42.56 |

| Zoom lens unit data | | |
|---|---|---|
| Unit | Leading surface | Focal length |
| 1 | 1 | 45.55 |
| 2 | 19 | −24.11 |
| 3 | 26 | −69.32 |
| 4 | 29 | 48.75 |
| 5 | 34 | ∞ |
| 6 | 35 | 98.09 |

Numerical Embodiment 6

| Unit mm | | | | |
|---|---|---|---|---|
| Surface data | | | | |
| Surface number | r | d | nd | vd | θgF |
|---|---|---|---|---|---|
| 1* | 31009.925 | 2.80 | 1.80100 | 35.0 | 0.5864 |
| 2 | 43.248 | 28.09 | | | |
| 3 | −75.259 | 2.20 | 1.65160 | 58.5 | 0.5390 |
| 4 | 319.253 | 0.15 | | | |
| 5 | 168.188 | 8.84 | 1.89286 | 20.4 | 0.6393 |
| 6 | −235.321 | 1.13 | | | |
| 7 | 154.953 | 13.15 | 1.53775 | 74.7 | 0.5392 |
| 8* | −104.494 | 6.03 | | | |
| 9 | 962.112 | 7.69 | 1.43875 | 94.7 | 0.5340 |
| 10 | −112.855 | 2.10 | 1.85478 | 24.8 | 0.6122 |
| 11 | −195.432 | 0.20 | | | |
| 12 | 149.662 | 2.10 | 1.80518 | 25.4 | 0.6161 |
| 13 | 56.047 | 15.24 | 1.43875 | 94.7 | 0.5340 |
| 14 | −595.811 | 0.52 | | | |
| 15 | 189.224 | 6.89 | 1.43387 | 95.1 | 0.5373 |
| 16 | −418.849 | 0.20 | | | |
| 17 | 177.934 | 8.70 | 1.76385 | 48.5 | 0.5589 |
| 18 | −146.341 | (variable) | | | |
| 19* | 118.284 | 1.25 | 2.00100 | 29.1 | 0.5997 |
| 20 | 24.302 | 6.57 | | | |
| 21 | −38.096 | 0.90 | 1.59522 | 67.7 | 0.5442 |
| 22 | 32.271 | 5.94 | 1.85478 | 24.8 | 0.6122 |
| 23 | −59.594 | (variable) | | | |
| 24 | −24.804 | 0.90 | 1.83481 | 42.7 | 0.5648 |
| 25 | −39.952 | (variable) | | | |
| 26 | −36.316 | 0.90 | 1.60300 | 65.4 | 0.5401 |
| 27 | 89.118 | 2.11 | 1.85478 | 24.8 | 0.6122 |
| 28 | 547.801 | (variable) | | | |

-continued

| | | Unit mm | | | |
|---|---|---|---|---|---|
| 29* | 68.309 | 6.83 | 1.90525 | 35.0 | 0.5848 |
| 30 | −112.002 | 0.20 | | | |
| 31 | −525.814 | 1.20 | 1.95375 | 32.3 | 0.5905 |
| 32 | 130.251 | 3.66 | 1.61800 | 63.3 | 0.5441 |
| 33 | −160.400 | (variable) | | | |
| 34(stop) | ∞ | 1.80 | | | |
| 35 | 177.658 | 1.80 | 2.00100 | 29.1 | 0.5997 |
| 36 | 51.018 | 11.07 | 1.49700 | 81.5 | 0.5375 |
| 37 | −59.460 | 0.20 | | | |
| 38 | 100.498 | 9.14 | 1.51633 | 64.1 | 0.5353 |
| 39 | −50.019 | 1.10 | 1.83481 | 42.7 | 0.5648 |
| 40 | 674.822 | 41.24 | | | |
| 41 | 64.337 | 8.11 | 1.43875 | 94.7 | 0.5340 |
| 42 | 48.022 | 2.73 | | | |
| 43 | 273.905 | 8.80 | 1.80810 | 22.8 | 0.6307 |
| 44 | −35.243 | 1.10 | 2.00100 | 29.1 | 0.5997 |
| 45 | −1291.761 | 0.71 | | | |
| 46 | 211.047 | 8.98 | 1.51742 | 52.4 | 0.5564 |
| 47 | −26.335 | 1.20 | 1.89190 | 37.1 | 0.5780 |
| 48 | 52.567 | 0.41 | | | |
| 49 | 37.385 | 11.11 | 1.48749 | 70.2 | 0.5300 |
| 50 | −58.875 | 42.99 | | | |
| Image plane | ∞ | | | | |

Aspherical data

1st surface
K = 3.99787e+05 A 4 = 1.03414e−06 A 6 = 1.93082e−09 A 8 = 6.60034e−12 A10 = 8.26805e−15 A12 = −1.38059e−19 A14 = −1.86068e−21 A16 = −5.61800e−26
A 3 = −1.66838e−06 A 5 = −2.38278e−08 A 7 = −1.27098e−10 A 9 = −2.69268e−13 A11 = −1.52572e−16 A13 = 8.28003e−20 A15 = 1.71920e−23

8th surface
K = −1.20590e+00 A 4 = 6.04613e−07 A 6 = 1.30338e−10 A 8 = −2.17710e−13 A10 = −6.40065e−16 A12 = −5.65209e−20
A 3 = −2.75867e−07 A 5 = −1.66535e−09 A 7 = −4.31108e−12 A 9 = 1.98180e−14 A11 = 9.48792e−18

19th surface
K = 7.21080e+00 A 4 = 4.55833e−06 A 6 = −5.10680e−08 A 8 = −2.79624e−09 A10 = −1.33211e−11 A12 = −3.83738e−15
A 3 = −1.52940e−06 A 5 = −1.24957e−07 A 7 = 1.78561e−08 A 9 = 2.53114e−10 A11 = 3.67957e−13

29th surface
K = −1.76940e−01 A 4 = −2.43116e−06 A 6 = −1.07245e−07 A 8 = −2.89273e−09 A10 = −1.28573e−11 A12 = 1.75278e−15 A14 = 1.80412e−17 A16 = 3.81973e−21
A 3 = −3.61691e−07 A 5 = 2.85560e−07 A 7 = 2.23171e−08 A 9 = 2.43693e−10 A11 = 3.47248e−13 A13 = −4.89533e−16 A15 = −3.61594e−19

Various data
Zoom ratio 7.78

| | Wide angle end | Middle | Telephoto end |
|---|---|---|---|
| Focal length | 15.40 | 45.00 | 119.76 |
| F-number | 2.72 | 2.71 | 3.65 |
| Half angle of view | 43.86 | 18.21 | 7.04 |
| Image height | 14.80 | 14.80 | 14.80 |
| Total lens length | 353.98 | 353.98 | 353.98 |
| BF | 42.99 | 42.99 | 42.99 |
| d18 | 1.15 | 37.59 | 55.59 |
| d23 | 3.28 | 3.09 | 3.53 |
| d25 | 40.18 | 4.72 | 2.08 |
| d28 | 10.59 | 14.36 | 1.23 |
| d33 | 9.78 | 5.24 | 2.56 |

Zoom lens unit data

| Unit | Leading surface | Focal length |
|---|---|---|
| 1 | 1 | 46.95 |
| 2 | 19 | −45.90 |
| 3 | 24 | −80.55 |
| 4 | 26 | −65.14 |

| | | | |
|---|---|---|---|
| | Unit mm | | |
| 5 | 29 | 49.31 | |
| 6 | 34 | 96.37 | |

Numerical Embodiment 7

| Unit mm | | | | | |
|---|---|---|---|---|---|
| Surface data | | | | | |
| Surface number | r | d | nd | vd | θgF |
| 1* | 269.913 | 2.80 | 1.80100 | 35.0 | 0.5864 |
| 2 | 44.227 | 20.13 | | | |
| 3 | 637.931 | 2.20 | 1.80100 | 35.0 | 0.5864 |
| 4 | 198.908 | 12.51 | | | |
| 5 | −81.215 | 2.20 | 1.63854 | 55.4 | 0.5484 |
| 6 | 621.767 | 0.15 | | | |
| 7 | 197.445 | 7.55 | 1.95906 | 17.5 | 0.6598 |
| 8 | −368.126 | 2.21 | | | |
| 9 | 159.646 | 15.97 | 1.52841 | 76.5 | 0.5396 |
| 10* | −100.236 | 7.06 | | | |
| 11 | 202.217 | 11.83 | 1.49700 | 81.5 | 0.5375 |
| 12 | −153.261 | 2.10 | 1.80810 | 22.8 | 0.6307 |
| 13 | −280.542 | 0.20 | | | |
| 14 | 180.053 | 2.10 | 1.80518 | 25.4 | 0.6161 |
| 15 | 58.357 | 16.93 | 1.43875 | 94.7 | 0.5340 |
| 16 | −286.222 | 0.26 | | | |
| 17 | 209.722 | 6.00 | 1.43387 | 95.1 | 0.5373 |
| 18 | −535.105 | 0.20 | | | |
| 19 | 165.599 | 6.37 | 1.43387 | 95.1 | 0.5373 |
| 20 | −787.673 | 0.35 | | | |
| 21 | 125.301 | 8.01 | 1.76385 | 48.5 | 0.5589 |
| 22 | −302.012 | (variable) | | | |
| 23* | 163.768 | 1.25 | 2.00100 | 29.1 | 0.5997 |
| 24 | 22.882 | 6.76 | | | |
| 25 | −60.207 | 0.90 | 1.59522 | 67.7 | 0.5442 |
| 26 | 27.749 | 8.23 | 1.85478 | 24.8 | 0.6122 |
| 27 | −48.303 | 1.42 | | | |
| 28 | −30.309 | 0.90 | 1.83481 | 42.7 | 0.5648 |
| 29 | −135.789 | (variable) | | | |
| 30 | −26.545 | 0.90 | 1.60300 | 65.4 | 0.5401 |
| 31 | 76.676 | 2.08 | 1.85478 | 24.8 | 0.6122 |
| 32 | −2342.425 | (variable) | | | |
| 33* | 51.486 | 6.13 | 1.90525 | 35.0 | 0.5848 |
| 34 | −157.600 | 0.20 | | | |
| 35 | 187.065 | 1.20 | 1.95375 | 32.3 | 0.5905 |
| 36 | 36.005 | 6.85 | 1.61800 | 63.3 | 0.5441 |
| 37 | 626.612 | (variable) | | | |
| 38(stop) | ∞ | 1.80 | | | |
| 39 | 84.514 | 1.80 | 1.95375 | 32.3 | 0.5905 |
| 40 | 52.223 | 5.25 | 1.49700 | 81.5 | 0.5375 |
| 41 | −102.212 | 6.75 | | | |
| 42 | 95.391 | 7.56 | 1.51633 | 64.1 | 0.5353 |
| 43 | −41.847 | 2.00 | 1.85150 | 40.8 | 0.5695 |
| 44 | 119.420 | 27.09 | | | |
| 45 | 52.730 | 11.35 | 1.43875 | 94.7 | 0.5340 |
| 46 | −45.850 | 4.20 | | | |
| 47 | 94.262 | 10.55 | 1.80810 | 22.8 | 0.6307 |
| 48 | −27.214 | 1.10 | 2.00100 | 29.1 | 0.5997 |
| 49 | 115.798 | 1.00 | | | |
| 50 | 86.107 | 8.95 | 1.51742 | 52.4 | 0.5564 |
| 51 | −26.907 | 1.20 | 1.90525 | 35.0 | 0.5848 |
| 52 | 61.542 | 0.47 | | | |
| 53 | 38.944 | 8.67 | 1.51633 | 64.1 | 0.5353 |
| 54 | −58.875 | 44.14 | | | |
| Image plane | ∞ | | | | |

-continued

Unit mm

Aspherical data

1st surface
K = −4.17990e+01 A 4 = 7.71336e−07 A 6 = 2.11159e−09 A 8 = 6.63467e−12 A10 = 8.24281e−15 A12 = −2.15272e−19 A14 = −1.79983e−21 A16 = −5.22228e−26
A 3 = −8.90337e−07 A 5 = −2.37087e−08 A 7 = −1.30814e−10 A 9 = −2.69487e−13 A11 = −1.49215e−16 A13 = 8.17630e−20 A15 = 1.63673e−23
10th surface
K = −2.88118e+00 A 4 = 4.26088e−07 A 6 = 1.48912e−10 A 8 = 2.23551e−13 A10 = −6.23258e−16 A12 = −8.34857e−20
A 3 = 3.70971e−08 A 5 = −1.07403e−09 A 7 = −9.76116e−12 A 9 = 9.01305e−15 A11 = 1.22959e−17
23th surface
K = −9.03038e+01 A 4 = 6.40305e−06 A 6 = −8.44709e−08 A 8 = −3.03087e−09 A10 = −1.27139e−11 A12 = −4.69417e−15
A 3 = 5.60546e−06 A 5 = 1.38750e−07 A 7 = 2.13193e−08 A 9 = 2.52289e−10 A11 = 3.68735e−13
33th surface
K = −9.57934e−02 A 4 = −2.57524e−06 A 6 = −1.11132e−07 A 8 = −2.84291e−09 A10 = −1.29901e−11 A12 = 6.38985e−17 A14 = 1.78744e−17 A16 = 5.58693e−21
A 3 = −5.73777e−07 A 5 = 3.20290e−07 A 7 = 2.22547e−08 A 9 = 2.40487e−10 A11 = 3.74561e−13 A13 = −4.32081e−16 A15 = −4.32450e−19

Various data
Zoom ratio 7.74

|  | Wide angle end | Middle | Telephoto end |
|---|---|---|---|
| Focal length | 17.66 | 45.64 | 136.64 |
| F-number | 3.00 | 3.00 | 4.00 |
| Half angle of view | 39.97 | 17.97 | 6.18 |
| Image height | 14.80 | 14.80 | 14.80 |
| Total lens length | 366.41 | 366.41 | 366.41 |
| BF | 44.14 | 44.14 | 44.14 |
| d22 | 1.50 | 24.60 | 36.01 |
| d29 | 15.14 | 4.11 | 6.87 |
| d32 | 24.88 | 21.39 | 0.80 |
| d37 | 17.03 | 8.46 | 14.87 |

Zoom lens unit data

| Unit | Leading surface | Focal length |
|---|---|---|
| 1 | 1 | 35.04 |
| 2 | 23 | −23.02 |
| 3 | 30 | −52.60 |
| 4 | 33 | 54.46 |
| 5 | 38 | 93.37 |

Numerical calculation of the inequalities (1)-(10) for the above described numerical embodiments 1-7 based on the lens data are listed in Table 1 below.

TABLE 1

|  |  | Embodiment | | | | | | |
|---|---|---|---|---|---|---|---|---|
|  |  | 1 | 2 | 3 | 4 | 5 | 6 | 7 |
| (1) | np | 1.96 | 1.92 | 1.96 | 1.96 | 1.92 | 1.89 | 1.96 |
| (2) | ν p | 17.5 | 18.9 | 17.5 | 17.5 | 18.9 | 20.4 | 17.5 |
| (3) | ft/f1 | 2.56 | 2.99 | 2.45 | 2.64 | 2.67 | 2.55 | 3.90 |
| (4) | fw/BF | 0.36 | 0.39 | 0.40 | 0.35 | 0.37 | 0.36 | 0.40 |
| (5) | (θ 11p_ave − θ 11n_ave)/ (ν 11p_ave − ν 11n_ave) | −0.0033 | −0.0030 | −0.0033 | −0.0033 | −0.0031 | −0.0029 | −0.0035 |
| (6) | (ν 11p_ave − ν 11n_ave) | −27.7 | −29.7 | −27.7 | −27.7 | −27.9 | −26.4 | −24.3 |
| (7) | fp1/f11 | −2.54 | −2.36 | −2.63 | −2.55 | −2.35 | −2.23 | −2.75 |
| (8) | fn1/f11 | 1.18 | 1.12 | 1.23 | 1.17 | 1.13 | 1.09 | 1.35 |
| (9) | f11/f1 | −0.99 | −1.25 | −0.94 | −1.02 | −1.06 | −1.06 | −1.40 |
| (10) | (θ 13p_ave − θ 13n_ave)/ (ν 13p_ave − ν 13n_ave) | −0.0015 | −0.0016 | −0.0015 | −0.0015 | −0.0014 | −0.0012 | −0.0014 |
|  | f1 | 46.814 | 39.006 | 48.428 | 45.437 | 45.554 | 46.954 | 35.036 |
|  | BF | 42.536 | 40.244 | 40.102 | 44.738 | 41.865 | 42.991 | 44.139 |

TABLE 1-continued

|  | Embodiment | | | | | | |
|---|---|---|---|---|---|---|---|
|  | 1 | 2 | 3 | 4 | 5 | 6 | 7 |
| fw | 15.400 | 15.832 | 15.912 | 15.443 | 15.364 | 15.401 | 17.657 |
| ft | 119.999 | 116.779 | 118.840 | 119.906 | 121.726 | 119.764 | 136.641 |
| fp1 | 117.203 | 114.671 | 119.490 | 117.665 | 113.555 | 111.001 | 134.883 |
| fn1 | −54.267 | −54.369 | −55.886 | −54.140 | −54.385 | −54.071 | −66.401 |
| f11 | −46.146 | −48.679 | −45.373 | −46.199 | −48.291 | −49.739 | −49.061 |

(Image pickup apparatus)

Next, referring to FIG. 15, an image pickup apparatus using the zoom lens of each embodiment as an image pickup optical system will be described.

Figure 15:
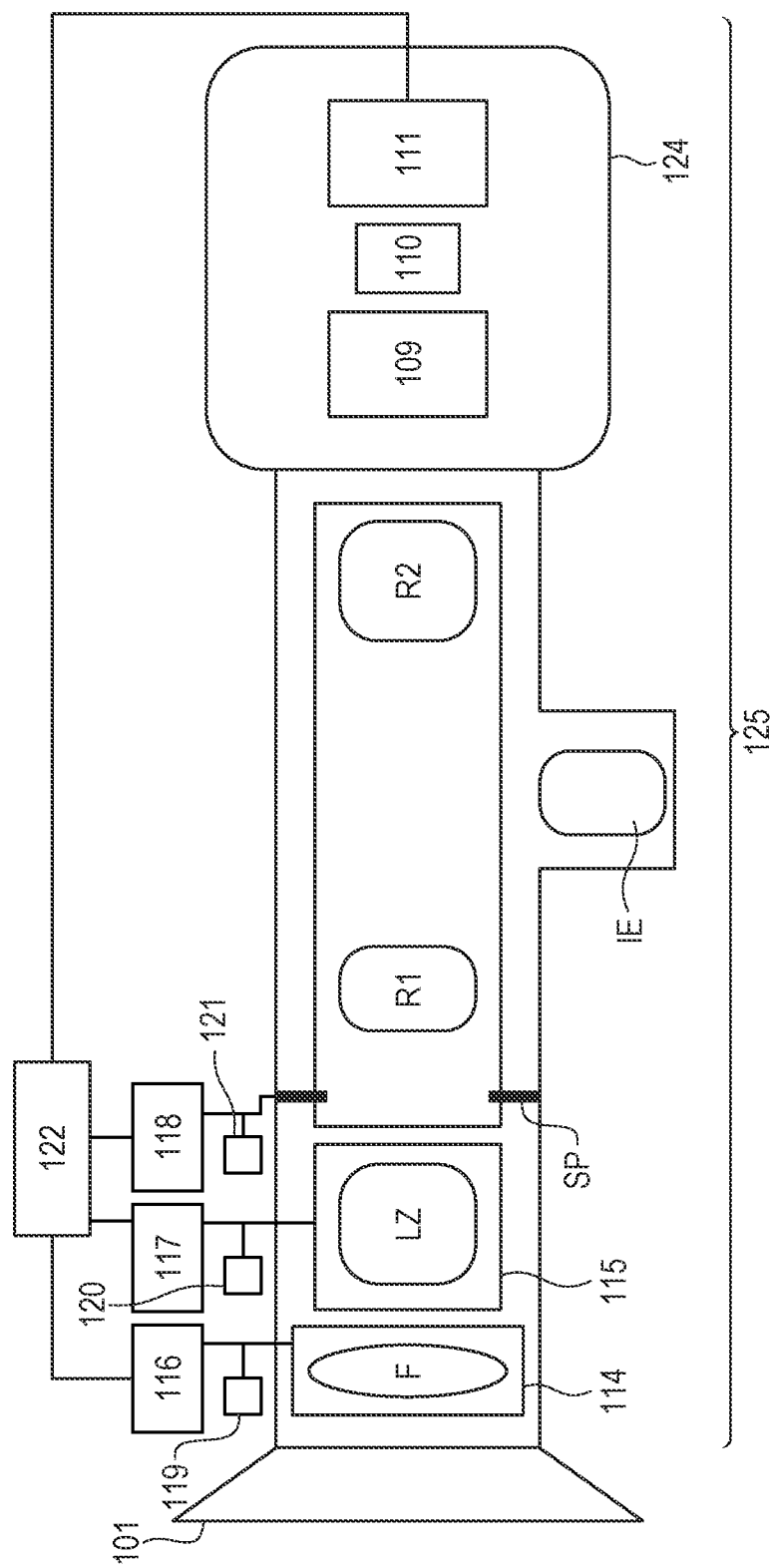
FIG. 15 is a configuration diagram of an image pickup apparatus according to the present invention.

FIG. 15 is a configuration diagram of an image pickup apparatus. In FIG. 15, a reference numeral 101 denotes a zoom lens of any one of Embodiments 1 to 7. Reference numeral 124 denotes a camera. The zoom lens 101 is attachable to and detachable from the camera 124. Reference numeral 125 denotes an image pickup apparatus constituted by mounting the zoom lens 101 to the camera 124. The zoom lens 101 includes a first lens unit F, a zoom unit LZ, and a lens unit R for forming an image. The first lens unit F includes a lens unit that moves during focusing.

The zoom unit LZ includes at least two lens units that move during zooming. An aperture stop SP, a lens unit R1, and a lens unit R2 are disposed in the image side of the zoom unit LZ. The lens unit IE can be inserted into and extracted from the optical path between the lens unit R1 and the lens unit R2. By inserting the lens unit IE between the lens unit R1 and the lens unit R2, the range of the focal length of the entire system of the zoom lens 101 is shifted.

Reference numerals 114 and 115 denote drive mechanisms such as helicoids and cams that drive the first lens unit F and the zoom unit LZ in the optical axis direction, respectively. Reference numerals 116 to 118 denote motors (drive means) that electrically drive the drive mechanisms 114 and 115 and the aperture stop SP.

Reference numerals 119 to 121 denote detectors such as encoders, potentiometers, and photosensors for detecting the positions of the first lens unit F and the zoom unit LZ on the optical axis and the aperture diameter of the aperture stop SP. In the camera 124, reference numeral 109 denotes a glass block corresponding to an optical filter and a color separation optical system in the camera 124, and reference numeral 110 denotes an image pickup element (photoelectric conversion element) such as a CCD sensor or a CMOS sensor that receives an object image formed by the zoom lens 101. Reference numerals 111 and 122 denote CPUs (control units) that control various kinds of driving of the camera 124 and the zoom lens 101. Thus, by using the zoom lens of each embodiment, an image pickup apparatus having high optical performance can be realized.

According to each embodiment, for example, it is possible to provide a zoom lens and an image pickup apparatus which are advantageous in terms of small size, light weight, high zoom ratio, and high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076153, filed May 2, 2022, which is hereby incorporated by reference herein in its entirety.

What is claimed is:

1. A zoom lens comprising in order from an object side to an image side: a first lens unit having a positive refractive power which does not move for zooming; at least three lens units which move during zooming; and a final lens unit having a positive refractive power, wherein an interval between adjacent lens units changes during zooming, wherein the first lens unit includes in order from the object side to the image side: a first lens subunit having a negative refractive power, a second lens subunit having a positive refractive power, and a third lens subunit having a positive refractive power, wherein an interval between adjacent lens subunits changes during focusing, wherein the first lens subunit does not move for focusing, at least the second lens subunit moves for focusing, and the third lens subunit does not move for focusing, wherein at least two lens units among the at least three lens units which move during zooming have negative refractive powers, wherein the zoom lens comprises an aperture stop arranged in or adjacent to the final lens unit, wherein following inequalities are satisfied, $1.86 \leq np \leq 2.15$ $15.0 \leq vp \leq 22.0$ $2.35 \leq ft/f1 \leq 6.00$ $0.28 \leq fw/BF \leq 0.43$ $-3.00 \leq fp1/f11 \leq -1.90$ where np and vp represent a refractive index and an Abbe number of a positive lens arranged closest to the object side among positive lenses included in the first lens unit, respectively, f1 represents a focal length of the first lens unit, fw represents a focal length of the zoom lens at a wide angle end, ft represents a focal length of the zoom lens at a telephoto end, BF denotes a back focus of the zoom lens at the wide angle end, fp1 represents a focal length of the positive lens arranged closest to the object side in the first lens unit, and f11 represents a focal length of the first lens subunit.

2. The zoom lens according to claim 1, wherein the first lens subunit includes in order from the object side to the image side, two or three negative lenses and one positive lens.

3. The zoom lens according to claim 1, wherein a following inequality is satisfied, $-0.0040 \leq (\theta 11p\_ave - \theta 11n\_ave)/(v11p\_ave - v11n\_ave) \leq -0.0020$ where θ11p_ave and ν11p_ave represent an average partial dispersion ratio and an average Abbe number of positive lenses included in the first lens subunit, respectively, and θ11n_ave and ν11n_ave represent an average partial dispersion ratio and average Abbe number of negative lenses included in the first lens subunit, respectively.

4. The zoom lens according to claim 3, wherein a following inequality is satisfied, −34.0≤(ν11p_ave−ν11n_ave)≤−21.0.

5. The zoom lens according to claim 1, wherein a following inequality is satisfied, 0.80≤fn1/f11≤1.50 where fn1 represents a focal length of the negative lens arranged closest to the object side in the first lens unit.

6. The zoom lens according to claim 1, wherein a following inequality is satisfied, −1.70≤f11/f1≤−0.70 where f1 represents a focal length of the first lens unit.

7. The zoom lens according to claim 1, wherein the third lens subunit consists of five or fewer lenses.

8. The zoom lens according to claim 1, wherein a following inequality is satisfied, −0.0022≤(θ13p_ave−θ13n_ave)/(ν13p_ave−ν13n_ave)≤−0.0006 where θ13p_ave and ν13p_ave represent an average partial dispersion ratio and an average Abbe number of positive lenses included in the third lens subunit, respectively, and θ13n_ave and ν13n_ave represent an average partial dispersion ratio and an average Abbe number of negative lenses included in the third lens unit are denoted by, respectively.

9. An image pickup apparatus comprising a zoom lens and an image pickup element for picking up an image formed by the zoom lens, wherein the zoom lens comprises in order from an object side to an image side: a first lens unit having a positive refractive power which does not move for zooming; at least three lens units which move during zooming; and a final lens unit having a positive refractive power, wherein an interval between adjacent lens units changes during zooming, wherein the first lens unit includes in order from the object side to the image side: a first lens subunit having a negative refractive power; a second lens subunit having a positive refractive power, and a third lens subunit having a positive refractive power, wherein an interval between adjacent lens subunits changes during focusing, wherein the first lens subunit does not move for focusing, at least the second lens subunit moves for focusing, and the third lens subunit does not move for focusing, wherein at least two lens units among the at least three lens units which move during zooming have negative refractive powers, wherein the zoom lens comprises an aperture stop arranged in or adjacent to the final lens unit, wherein following inequalities are satisfied, 1.86≤np≤2.15

15.0≤vp≤22.0

2.35≤ft/f1≤6.00

0.28≤fw/BF≤0.43

−3.00≤fp1/f11≤−1.90 where np and vp represent a refractive index and an Abbe number of a positive lens arranged closest to the object side among positive lenses included in the first lens unit, respectively, f1 represents a focal length of the first lens unit, fw represents a focal length of the zoom lens at a wide angle end, ft represents a focal length of the zoom lens at a telephoto end, BF denotes a back focus of the zoom lens at the wide angle end, fp1 represents a focal length of the positive lens arranged closest to the object side in the first lens unit, and f11 represents a focal length of the first lens subunit.

10. The zoom lens according to claim 1, wherein a following inequality is satisfied, 2.55≤ft/f1≤6.00.

11. The zoom lens according to claim 1, wherein a following inequality is satisfied, 2.43≤ft/f1≤6.00.

* * * * *